US011356401B2

(12) United States Patent
Shanmugam et al.

(10) Patent No.: US 11,356,401 B2
(45) Date of Patent: Jun. 7, 2022

(54) PROVIDING A SYSTEM WITH ACCESS TO A RESOURCE USING A DISPOSABLE EMAIL ADDRESS

(71) Applicant: Oath Inc., New York, NY (US)

(72) Inventors: Gnanavel Shanmugam, San Jose, CA (US); Nitin Jose, San Jose, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 374 days.

(21) Appl. No.: 16/374,008

(22) Filed: Apr. 3, 2019

(65) Prior Publication Data

US 2020/0322302 A1 Oct. 8, 2020

(51) Int. Cl.
*G06F 15/16* (2006.01)
*H04L 51/48* (2022.01)
*H04L 9/40* (2022.01)
*H04L 51/046* (2022.01)

(52) U.S. Cl.
CPC ............ *H04L 51/28* (2013.01); *H04L 51/046* (2013.01); *H04L 63/0807* (2013.01); *H04L 63/108* (2013.01)

(58) Field of Classification Search
CPC ..... H04L 51/046; H04L 51/063; H04L 51/12; H04L 51/22; H04L 51/28; H04L 63/08; H04L 63/0807; H04L 63/108
See application file for complete search history.

(56) References Cited

U.S. PATENT DOCUMENTS

| | | | | |
|---|---|---|---|---|
| 7,558,829 | B1* | 7/2009 | Perlman | G06Q 10/107 709/206 |
| 2005/0114453 | A1* | 5/2005 | Hardt | H04L 51/28 709/206 |
| 2005/0210107 | A1* | 9/2005 | Mora | H04L 51/28 709/206 |
| 2006/0041621 | A1* | 2/2006 | Libbey | H04L 51/28 709/206 |
| 2014/0047043 | A1* | 2/2014 | Esfahani | H04L 51/28 709/206 |

* cited by examiner

*Primary Examiner* — Normin Abedin
(74) *Attorney, Agent, or Firm* — Cooper Legal Group LLC

(57) ABSTRACT

One or more computing devices, systems, and/or methods for providing a system with access to resources associated with a user account using a disposable email address (DEA) are provided. A request to provide a system with access to a first set of resources may be received. The first set of resources may be associated with a first email account associated with a first email address. A first DEA associated with the first email account may be generated. The first DEA may be transmitted to the system. A first set of modified emails may be generated based upon a first set of emails of the first email account. A first modified email of the first set of modified emails may comprise an indication of the first DEA. Access to the first set of modified emails may be provided to the system. The first DEA may be deactivated.

20 Claims, 12 Drawing Sheets

PROVIDING A SYSTEM WITH ACCESS TO A RESOURCE USING A DISPOSABLE EMAIL ADDRESS

BACKGROUND

Many systems, such as websites, price protection systems, content platforms, etc. may provide services using resources of an email account associated with an email service provider. For example, a first system may be authorized to access one or more resources of a first email account and/or may be provided with access to personal information (e.g., email address, phone number, mailing address, etc.) associated with the first email account. As a result of the first system being provided with the access to the personal information, the personal information may be disclosed to entities without the first user's permission and/or the personal information may be misused.

SUMMARY

In accordance with the present disclosure, one or more computing devices and/or methods are provided. In an example, a request to provide a system with access to a first set of resources may be received. The first set of resources may be associated with a first email account associated with a first email address. A first disposable email address (DEA) associated with the first email account may be generated. The first DEA may be transmitted to the system. Emails of the first email account may be analyzed to identify a first set of emails associated with the request. A first set of modified emails may be generated based upon the first set of emails. A first modified email of the first set of modified emails may comprise an indication of the first DEA. Access to the first set of modified emails may be provided to the system. A first email may be received from the system. The first email may be addressed to a second email address. The first email may be indicative of the first DEA (e.g., a first sender address of the first email may be indicative of the first DEA). A second email may be generated based upon the first email. The second email may be indicative of the first email address (e.g., a second sender address of the second email may be indicative of the first email address). The second email may be transmitted to a second email account associated with the second email address. The first DEA may be deactivated.

In an example, a graphical user interface of a first client device associated with a first user account may be controlled to display a selectable input associated with providing a system with access to a first set of resources associated with the first user account. A request to provide the system with access to the first set of resources may be received via a selection of the selectable input. A first DEA associated with the first user account may be generated. The first DEA associated with the first user account may be transmitted to the system.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
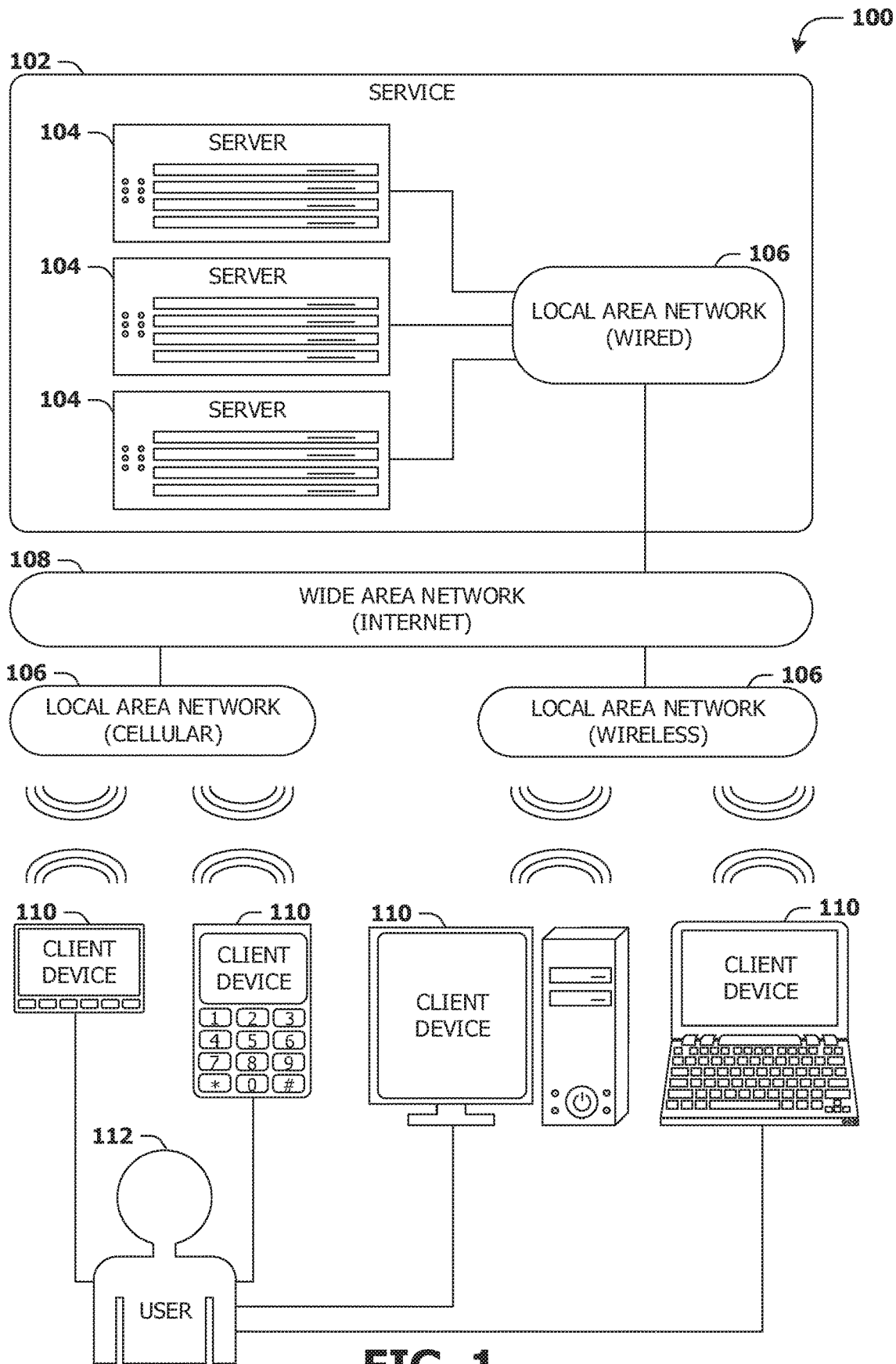
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
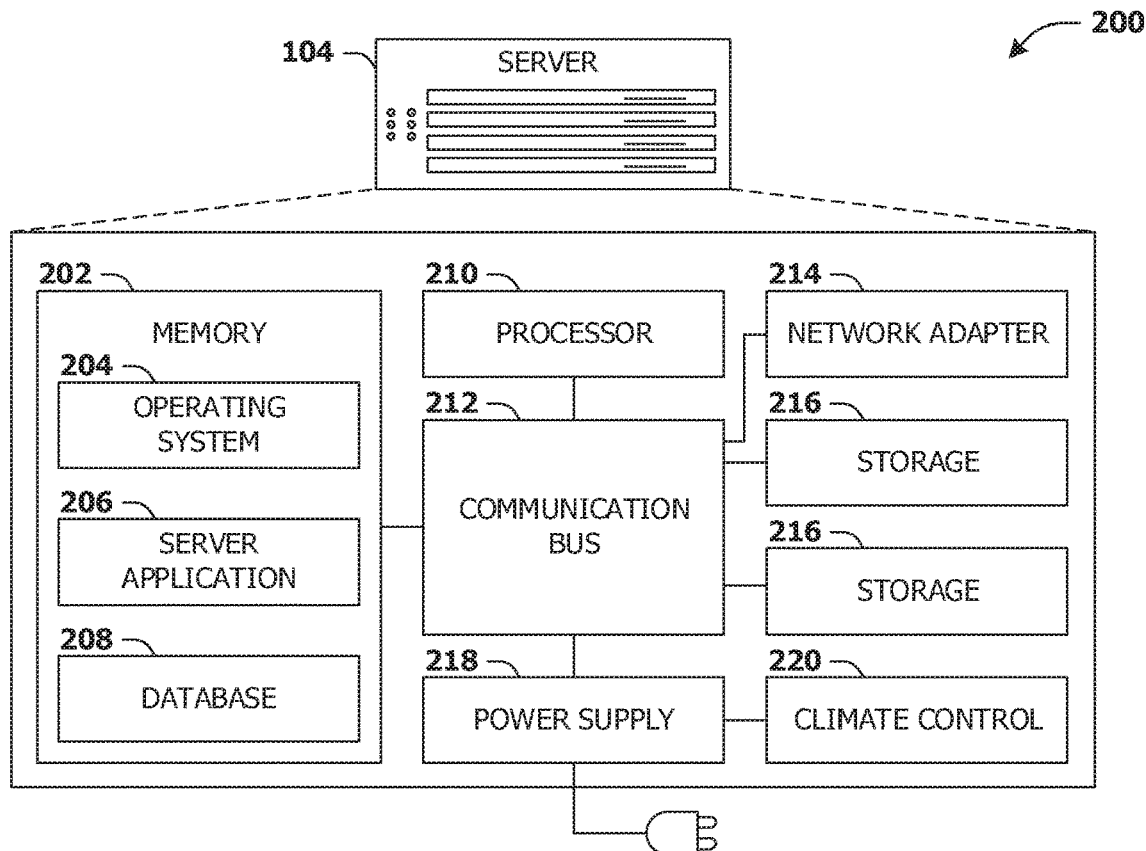
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
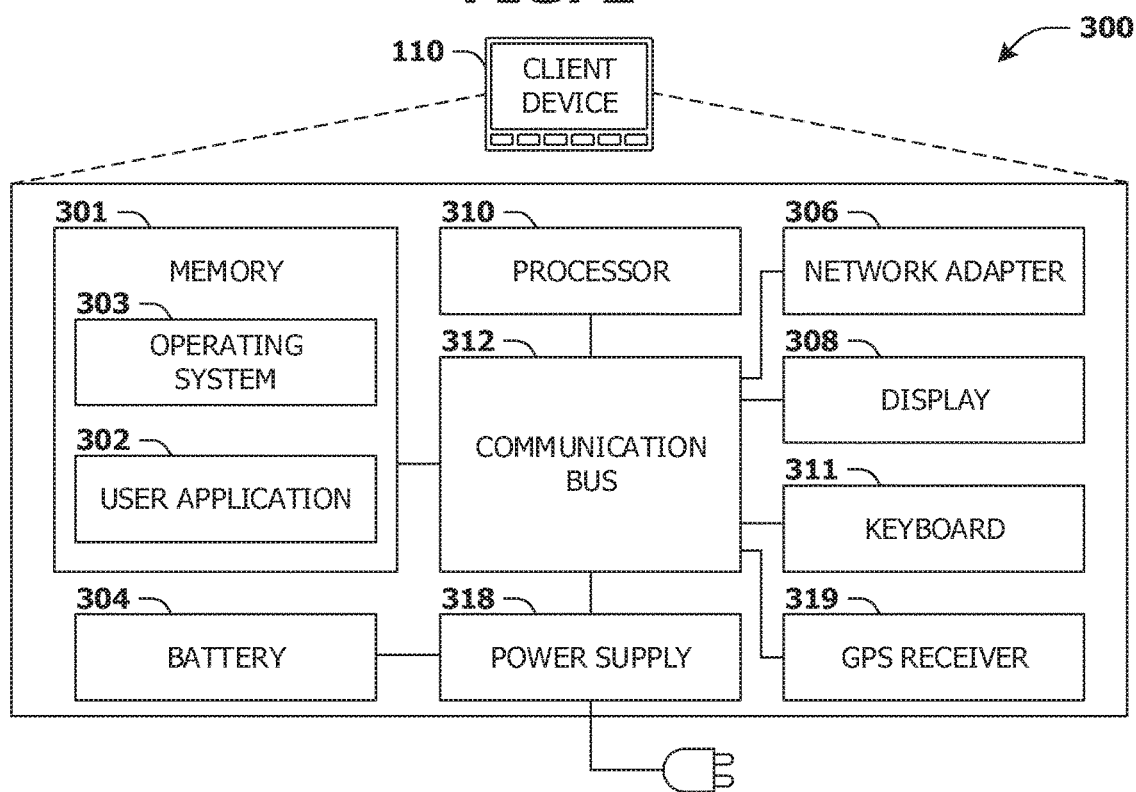
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for providing a system with access to one or more resources associated with a user account using a disposable email address (DEA) are provided. For example, a first user may want a first system to have access to one or more first resources associated with a first user account associated with the first user. For example, the first user account may correspond to a first email account and/or the first system may correspond to one or more of a news system (e.g., a system configured to provide news content), a scheduling system (e.g., a system configured to provide scheduling services), a purchase protection system (e.g., a system configured to provide purchase protection services), a social network system, a communication system (e.g., one or more of a messaging system, a video calling system, an audio calling system, etc.), etc. In some examples, identification information associated with the first user account may be transmitted to the first system. For example, the identification information may comprise one or more of a name of the first user (and/or a name associated with the first user account), a first username associated with the first user account, a first email address associated with the first email account, a phone number associated with the first user account (and/or the first user), a mailing address associated with the first user account (and/or the first user), etc. However, the identification information may be misused and/or may be used in ways the first user does not approve and/or desire. For example, the identification information may be disclosed to entities without the first user's permission, the identification information may be collected and/or used for directing promotional content to the first user that the first user does not have an interest in, the first email account associated with the first user may be subscribed to one or more subscription services without the first user's permission, etc. Alternatively and/or additionally, emails associated with the entities may be transmitted to the first email account for an extended period of time.

In accordance with one or more of the techniques presented herein, a request to provide the first system with access to the one or more first resources may be received. A first DEA associated with the first email account may be generated. The first DEA may be transmitted to the first system. For example, the identification information, comprising the first DEA, may be transmitted to the first system. Alternatively and/or additionally, the identification information may not comprise the first email address and/or the first username. In some examples, the first system may be provided with access to the one or more first resources. For example, the one or more first resources may comprise one or more of one or more emails associated with the first email account, one or more social media posts associated with the first user account, etc. In some examples, the first DEA may be deactivated. For example, the first DEA may be deactivated responsive to receiving a request to deactivate the first DEA. Alternatively and/or additionally, the first DEA may be deactivated responsive to a duration of time that the first DEA is active meeting a threshold duration of time. In some examples, responsive to deactivating the first DEA, the first system may not be provided with access to resources associated with the first user account.

Figure 4:
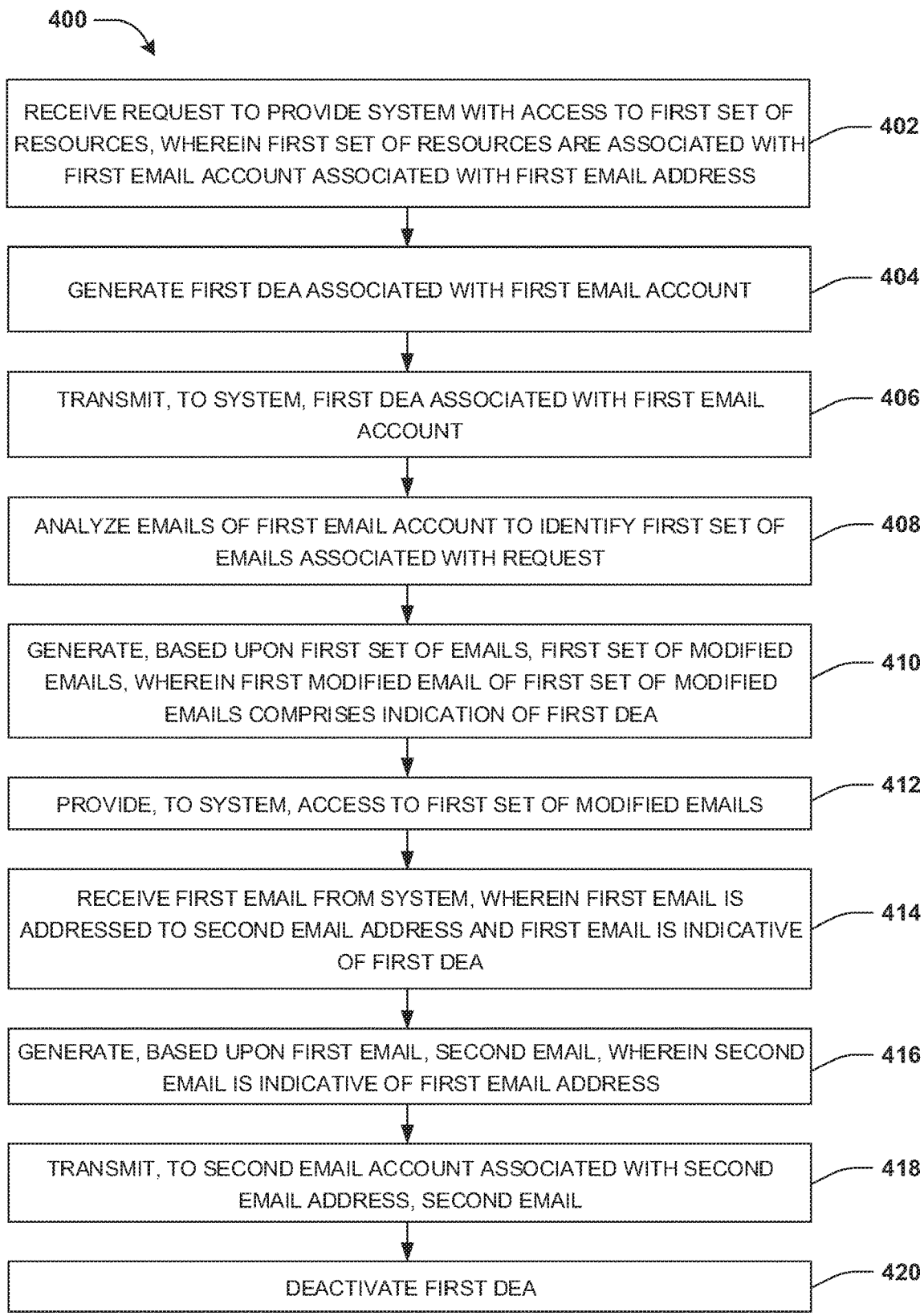
FIG. 4 is a flow chart illustrating an example method for providing a system with access to one or more resources associated with a user account using a disposable email address (DEA).

An embodiment of providing a system with access to one or more resources associated with a user account using a DEA is illustrated by an example method 400 of FIG. 4. A first user, such as user Jill, (e.g., and/or a first client device associated with the first user) may access and/or interact with one or more interfaces associated with a content system. For example, the one or more interfaces may correspond to one or more of one or more applications (e.g., mobile applications) installed on the first client device, one or more websites accessed via a browser of the first client device, software installed on the first client device, etc. associated with the content system. Alternatively and/or additionally, each interface of the one or more interfaces may be associated with a service, of one or more services, provided by the content system. For example, the content system may be an internet system providing the one or more interfaces, where each interface of the one or more interfaces may provide a service of the one or more services. Alternatively and/or additionally, the first user may access and/or interact with the content system using a first user account with the content system. In some examples, the first user account may correspond to a first email account.

In some examples, the content system may be associated with an email service provider for sending and/or receiving emails. For example, an email interface of the one or more interfaces associated with the content system may be used to send and/or receive emails associated with the first email account. Alternatively and/or additionally, the content system may be associated with a communication service (and/or a messaging service, etc.) for performing communications via messaging, voice calls, video calls, etc. For example, a communication interface of the one or more interfaces associated with the content system may be used to send and/or receive messages and/or perform communications via one or more of messaging, voice calls, video calls, etc. Alternatively and/or additionally, the content system may be associated with a social media service for social networking and/or posting social media posts. For example, a social media interface of the one or more interfaces associated with the content system may be used to post social media posts, perform communications via messaging and/or connect with users of the social media service. Alternatively and/or additionally, the content system may be associated with a scheduling service (e.g., the scheduling service may be associated with an electronic calendar associated with the first user account). For example, a scheduling interface of the one or more interfaces associated with the content system may be used for scheduling events, meetings, etc. and/or for viewing holidays, occasions, receiving notifications indicative of upcoming events and/or meetings, etc. Alternatively and/or additionally, the content system may be associated with a search engine service for performing searches. For example, a search interface of the one or more interfaces associated with the content system may be used for performing searches based upon queries. Alternatively and/or additionally, the content system may be associated with a news content service for consuming, downloading and/or viewing news content (e.g., news videos, news articles, etc.). For example, a news content interface of the one or more interfaces associated with the content system may be used for consuming, downloading and/or viewing news content. Alternatively and/or additionally, the content system may be associated with a media platform video for consuming, downloading, uploading and/or viewing media (e.g., videos, audio, etc.). For example, a media platform interface of the one or more interfaces associated with the content system may be used for consuming, downloading, uploading and/or viewing media (e.g., videos, audio, etc.).

In some examples, one or more resources associated with the first user account (and/or the first email account) may be used by one or more systems. The one or more systems may be different than the content system. Alternatively and/or additionally, the one or more systems may be authorized (by the first user, the first client device and/or the content system) to access the one or more resources. Alternatively and/or additionally, rather than disclosing personal information (such as email addresses), a DEA may be generated for a system of the one or more systems and/or the DEA may be used for system authorization (e.g., the DEA may be used for logging into the system and/or for authorizing access to the one or more resources).

At 402, a first request to provide a second system with access to a first set of resources may be received. For example, the first set of resources may be associated with the first email account (and/or the first user account). In some examples, the first email account (and/or the first user account) may be associated with a first email address (e.g., "jillhiggins@exampleemail.com") and/or a first username (e.g., "jillhiggins"). Alternatively and/or additionally, the second system may be different than and/or separate from the content system (e.g., the second system may be an external third party system with respect to the content system).

In some examples, the first request may be received using a system interface associated with the second system. For example, the system interface may correspond to a website, an application (e.g., a mobile application), software, etc. associated with the second system. Alternatively and/or additionally, the system interface may be provided by the second system. In some examples, the system interface may display a first selectable input associated with providing the second system with access to the first set of resources. Alternatively and/or additionally, the first selectable input may be associated with linking the second system with the first email account (and/or the first user account). Alternatively and/or additionally, the first selectable input may be associated with enabling the second system to perform operations associated with the first email account (and/or the first user account) on behalf of the first user. Alternatively and/or additionally, the first selectable input may be associated with logging into the second system using the content system and/or the first email account (and/or the first user account).

Alternatively and/or additionally, the first request may be received using one or more of the email interface of the one or more interfaces associated with the content system, the communication interface of the one or more interfaces associated with the content system, the social media interface of the one or more interfaces associated with the content system, the scheduling interface of the one or more interfaces associated with the content system, the search interface of the one or more interfaces associated with the content system, the news content interface of the one or more interfaces associated with the content system, the media platform interface of the one or more interfaces associated with the content system, etc. In some examples, a second selectable input associated with providing the second system with access to the first set of resources may be displayed via an interface of the one or more interfaces associated with the content system. Alternatively and/or additionally, the second selectable input may be associated with linking the second system with the first email account (and/or the first user account). Alternatively and/or additionally, the second selectable input may be associated with enabling the second system to perform operations associated with the first email account (and/or the first user account) on behalf of the first user. Alternatively and/or additionally, the second selectable input may be associated with logging into the second system using the content system and/or the first email account (and/or the first user account).

In some examples, content accessed via the interface of the one or more interfaces may be analyzed to determine that subject matter associated with the content matches and/or is related to the second system and/or to one or more services provided by the second system. The second selectable input may be displayed based upon a determination that the subject matter associated with the content matches and/or is related to the second system and/or one or more services provided by the second system. Alternatively and/or additionally, a content item (e.g., an advertisement, a selectable graphical object, etc.) comprising the second selectable input may be displayed based upon the determination that the subject matter associated with the content matches and/or is related to the second system and/or to one or more services provided by the second system.

In an example, the second system may be associated with a price protection system associated with analyzing purchase information associated with users to obtain refunds and/or compensation responsive to price reductions associated with purchased products. The second selectable input and/or the content item comprising the second selectable input may be displayed by the email interface responsive to an email comprising purchase information (e.g., a purchase confirmation, a purchase receipt, etc.) being accessed via the email interface and/or being received by the first email account. Alternatively and/or additionally, the second selectable input and/or the content item comprising the second selectable input may be displayed by the search interface responsive to identifying a query inputted into the search interface that is related to the price protection system (e.g., the query may comprise one or more keywords associated with the price protection system, such as one or more of "refund", "price protection", "low prices", "low price guarantee", etc.). Alternatively and/or additionally, the second selectable input and/or the content item comprising the second selectable input may be displayed by the media platform interface responsive to identifying content (e.g., a video) accessed via the media platform interface that is related to the price protection system (e.g., the content may be a video discussing price protection rules).

In some examples, responsive to a selection of the first selectable input and/or the second selectable input, a permission request may be received from the second system (and/or a server associated with the second system) by the content system (and/or by a server associated with the content system). In some examples, the permission request may correspond to a request for a request token. Responsive to receiving the permission request from the second system, the content system may transmit the request token to the second system and/or to the first client device. For example, the request token may be stored in memory of a server associated with the second system and/or in memory of the first client device. Alternatively and/or additionally, the request token may be stored in a cookie (associated with a browser of the first client device, for example).

Alternatively and/or additionally, responsive to receiving the permission request from the second system, the content system may transmit a token secret to the second system and/or to the first client device. In some examples, the token secret may be used by the content system in association with the request token to prevent one or more of forgery, hacking, etc. In some examples, the token secret may be stored in memory of a server associated with the second system and/or in memory of the first client device. Alternatively and/or additionally, the token secret may be stored in the cookie.

In some examples, the first client device may be redirected to an authorization interface associated with the content system. The authorization interface may correspond to an authorization web page associated with the content system (e.g., the authorization web page may be provided by the content system). For example, a web address (e.g., a uniform resource locator (URL)) may be used to access the authorization interface. In some examples, the web address may be generated based upon the request token. For example, the web address may comprise an indication of the request token.

In some examples, the authorization interface may display a login interface. For example, login information, such as the first email address (and/or the first username associated with the first user account) and/or a password associated with the first email account (and/or the first user account), may be input into the login interface. For example, the login information may be received from the first client device via the login interface of the authorization interface. For example, an authentication process may be performed using the login interface to verify an identity of the first user (e.g., to verify that the first user interacting with the login interface is associated with the first email account). In some examples, the authentication process may be performed using the login information, a two-step verification process, a multi-factor authentication (MFA) process, a single-factor authentication process and/or a different type of authentication process.

In some examples, responsive to receiving the login information and/or responsive to performing the authentication process, a consent interface may be displayed (e.g., the consent interface may be displayed by the authorization interface). In some examples, the consent interface may comprise a scope message indicative of an access scope associated with the first request to provide the second system with access to the first set of resources. In some examples, the access scope may be determined (by the content system) based upon the permission request.

In some examples, the access scope may be indicative of one or more first types of resource access associated with the first request. For example, a first type of resource access may correspond to reading emails composed using the first email account (e.g., the first type of resource access may be associated with enabling the second system to access, consume and/or analyze emails composed using the first email account). Alternatively and/or additionally, a second type of resource access may correspond to reading emails received by the first email account (e.g., the second type of resource access may be associated with enabling the second system to access, consume and/or analyze emails received by the first email account). Alternatively and/or additionally, a third type of resource access may correspond to reading emails associated with the first email account that are associated with one or more first types of emails (e.g., the third type of resource access may be associated with enabling the second system to access, consume and/or analyze emails associated the first email account that are associated with the one or more first types of emails). For example, the one or more first types of emails may correspond to one or more of emails comprising payment information (e.g., purchase receipts, purchase confirmations, etc.), emails comprising advertisement material, emails associated with subscriptions, etc. Alternatively and/or additionally, a fifth type of resource access may correspond to composing and/or transmitting emails from the first email account (and/or on behalf of the first user) to one or more other email accounts (e.g., the emails may be transmitted having sender addresses indicative of the first email address). Alternatively and/or additionally, a sixth type of resource access may correspond to deleting emails associated with the first email account (e.g., the sixth type of resource access may be associated with enabling the second system to delete emails associated with the first email account).

Alternatively and/or additionally, a seventh type of resource access may correspond to reading social media posts composed and/or posted using the first user account (e.g., the seventh type of resource access may be associated with enabling the second system to access, consume and/or analyze social media posts associated with the first user account). Alternatively and/or additionally, an eighth type of resource access may correspond to reading social media posts that are accessible via the first user account (e.g., the eighth type of resource access may be associated with enabling the second system to access, consume and/or analyze social media posts that are accessible via the first user account). Alternatively and/or additionally, a ninth type of resource access may correspond to composing and/or posting social media posts using the first user account (and/or on behalf of the first user and/or the first user account). Alternatively and/or additionally, a tenth type of resource access may correspond to deleting social media posts associated with the first user account (e.g., the tenth type of resource access may be associated with enabling the second system to delete social media posts associated with the first user account).

Alternatively and/or additionally, an eleventh type of resource access may correspond to reading messages composed and/or transmitted using the first user account (e.g., the eleventh type of resource access may be associated with enabling the second system to access, consume and/or analyze messages composed and/or transmitted by the first user account). Alternatively and/or additionally, a twelfth type of resource access may correspond to reading messages received using the first user account (e.g., the twelfth type of resource access may be associated with enabling the second system to access, consume and/or analyze messages received by the first user account). Alternatively and/or additionally, a thirteenth type of resource access may correspond to composing and/or transmitting messages from the first user account (and/or on behalf of the first user and/or the first user account) to one or more other user accounts. Alternatively and/or additionally, a fourteenth type of resource access may correspond to deleting messages associated with the first user account (e.g., the fourteenth type of resource access may be associated with enabling the second system to delete messages associated with the first user account).

Alternatively and/or additionally, a fifteenth type of resource access may correspond to reading schedule information (e.g., one or more events, occasions, meetings, etc.) associated with the scheduling interface and/or the electronic calendar associated with the first user account. Alternatively and/or additionally, a sixteenth type of resource access may correspond to generating and/or adding one or more of events, occasions, meetings, etc. to the electronic calendar associated with the first user account (on behalf of the first user and/or the first user account). Alternatively and/or additionally, a seventeenth type of resource access may correspond to reading search history associated with the search interface (e.g., the seventeenth type of resource access may be associated with enabling the second system to access the search history). Alternatively and/or additionally, an eighteenth type of resource access may correspond to accessing activity information associated with the media platform interface (e.g., the eighteenth type of resource access may be associated with enabling the second system to access and/or determine videos, audio, articles, etc. accessed by the first user account).

In some examples, the consent interface may comprise a third selectable input associated with providing the second system with access to the first set of resources (e.g., the third selectable input may be associated with providing the second system with access to resources associated with the access scope). For example, a selection of the third selectable input may be indicative of (and/or interpreted as) consent of the first user to provide the second system with access to resources associated with the access scope. In some examples, responsive to a selection of the third selectable input, the request token may be authorized (by the content system) and/or the second system may be granted access to the first set of resources (e.g., the second system may be granted access to resources associated with the access scope).

In some examples, the first request to provide the second system with access to the first set of resources may be received by the content system after the selection of the third selectable input (and/or before the selection of the third selectable input). Alternatively and/or additionally, the first request to provide the second system with access to the first set of resources may be received after the request token is authorized (and/or before the request token is authorized). Alternatively and/or additionally, the first request may comprise the request token and/or the token secret.

In some examples, an access message may be transmitted to the second system (by the content system). For example, the access message may be transmitted to the second system responsive to receiving the first request. Alternatively and/or additionally, the access message may be transmitted to the second system responsive to receiving the request token and/or the token secret and/or determining that the request token is authorized. In some examples, the access message may comprise an access token and/or an access secret. Alternatively and/or additionally, the access token and/or the access secret may be used by the second system to access the first set of resources (and/or resources associated with the access scope).

At 404, a first DEA associated with the first email account may be generated. For example, the first DEA may be generated responsive to receiving the first request to provide the second system with access to the one or more first resources. In some examples, the first DEA may be generated based upon the first email address associated with the first email account (and/or the first username associated with the first email account). For example, a portion of the first email address may be replaced with one or more characters (e.g., the first email address may be "jillhiggins@exampleemail.com" and/or the first DEA may be "4302higgins@exampleemail.com", "jillhig305@exampleemail.com", ji303iggins@exampleemail.com", etc.). Alternatively and/or additionally, one or more characters may be added to the first email address (e.g., the first email address may be "jillhiggins@exampleemail.com" and/or the first DEA may be "3928jillhiggins@exampleemail.com", "jillhiggins4032@exampleemail.com", etc.). Alternatively and/or additionally, the first DEA may comprise a (random) sequence of characters (e.g., letters, words and/or symbols) (e.g., the first DEA may be "k034950@exampleemail.com"). In some examples, the first DEA may be connected to the first email account via Internet Message Access Protocol (IMAP)-In.

At 406, the first DEA may be transmitted to the second system. In some examples, the first DEA may be transmitted to the second system via the access message (e.g., the access message may comprise the first DEA, the access token and/or the access secret). Alternatively and/or additionally, the first DEA may be transmitted to the second system separately from the access message. In some examples, first identification information associated with the first email account (and/or the first user account) may be generated. The first identification information may comprise the first DEA, a name of the first user (and/or a name associated with the first email account and/or the first user account) and/or a profile picture associated with the first email account and/or the first user account. In some examples, the first identification information may be transmitted to the second system via the access message (e.g., the access message may comprise the first identification information comprising the first DEA, the access token and/or the access secret). Alternatively and/or additionally, the first identification message may be transmitted to the second system separately from the access message.

In some examples, the first DEA may be generated and/or transmitted to the second system based upon a selection of a fourth selectable input associated with sharing a DEA, rather than the first email address, with the second system. For example, the first DEA, rather than the first email address, may be included in the first identification information based upon (and/or responsive to) the selection of the fourth selectable input. For example, the authorization interface and/or the consent interface (and/or a different interface) may comprise the fourth selectable input and/or a fifth selectable input. The fifth selectable input may be associated with sharing the first email address with the second system. For example, responsive to a selection of the fifth selectable input, the first email address may be transmitted to the second system (e.g., the first email address may be included in the first identification information responsive to the selection of the fifth selectable input). Alternatively and/or additionally, responsive to the selection of the fifth selectable input, the first DEA may not be generated and/or transmitted to the second system.

Alternatively and/or additionally, the first DEA may be generated and/or transmitted to the second system (automatically). For example, the first DEA may be generated and/or transmitted to the second system based upon a determination that the second system is associated with a first level of access. For example, the second system may be identified and/or determined based upon the permission request. A system database may be analyzed based upon the second system to determine a level of access associated with the second system. The system database may be indicative of a plurality of systems associated with the content system and/or a plurality of levels of access associated with the plurality of systems. For example, a system of the plurality of systems may be tagged with an indication of a level of access of the plurality of levels of access.

In some examples, first systems (of the plurality of systems) associated with the first level of access may be associated with sharing (merely) DEAs associated with email accounts (and/or user accounts) with the first systems (e.g., but not sharing original and/or authentic email addresses associated with the email accounts). Alternatively and/or additionally, second systems (of the plurality of systems) associated with a second level of access may be associated with sharing (original and/or authentic) email addresses associated with email accounts (and/or user accounts) with the second systems. In some examples, the first systems may be determined to be associated with the first level of access based upon an amount of compensation received from entities associated with the first systems. For example, a first exemplary system of the first systems (such as the second system) may be determined to be associated with the first level of access if an amount of compensation (e.g., a payment amount) received from an entity associated with the first exemplary system does not meet a compensation threshold. Alternatively and/or additionally, a second exemplary system of the second systems may be determined to be associated with the second level of access if an amount of compensation received from an entity associated with the second exemplary system meets the compensation threshold.

In some examples, the first request may correspond to a request for the second system to be provided with user information (e.g., the first identification information) for purposes of logging the first client device and/or the system interface into the second system. For example, the first set of resources may (merely) comprise the first identification information. For example, the first identification information and/or the first DEA may be used by the second system to log the first client device and/or the system interface into the second system. Alternatively and/or additionally, the first identification information and/or the first DEA may be used by the second system to create an account associated with the second system for the first user.

At 408, emails of the first email account may be analyzed to identify a first set of emails (e.g., a set of one or more emails) associated with the first request (and/or associated with the access scope). For example, the first set of emails may be determined to be associated with the access scope and/or the one or more first types of resource access associated with the first request. Responsive to the one or more first types of resource access of the access scope comprising the first type of resource access (associated with emails composed using the first email account), one or more emails of the first set of emails may be identified (and/or included in the first set of emails) based upon a determination that the one or more emails are composed and/or transmitted using the first email account. Alternatively and/or additionally, responsive to the one or more first types of resource access of the access scope comprising the second type of resource access (associated with emails received by the first email account), one or more emails of the first set of emails may be identified (and/or included in the first set of emails) based upon a determination that the one or more emails are received by the first email account. Alternatively and/or additionally, responsive to the one or more first types of resource access of the access scope comprising the third type of resource access (associated with emails that are associated with the one or more first types of emails), one or more emails of the first set of emails may be identified (and/or included in the first set of emails) based upon a determination that the one or more emails are associated with the one or more first types of emails. Alternatively and/or additionally, responsive to the access scope being associated with access to emails associated with the first email account, the first set of emails may comprise emails associated with the first email account (e.g., the first set of emails may comprise every email transmitted and/or received by the first email account).

Alternatively and/or additionally, in an example where the access scope and/or the one or more first types of resource access associated with the first request are associated with social media posts of the first user account, social media posts associated with the first user account may be analyzed to identify a first set of social media posts (e.g., a set of one or more social media posts) associated with the first request (and/or associated with the access scope). For example, the first set of social media posts may be determined to be associated with the access scope and/or the one or more first types of resource access associated with the first request. Responsive to the one or more first types of resource access of the access scope comprising the seventh type of resource access (associated with social media posts composed and/or posted using the first user account), one or more social media posts of the first set of social media posts may be identified (and/or included in the first set of social media posts) based upon a determination that the one or more social media posts are composed and/or posted using the first user account. Alternatively and/or additionally, responsive to the one or more first types of resource access of the access scope comprising the eighth type of resource access (associated with social media posts accessible by the first user account), one or more social media posts of the first set of social media posts may be identified (and/or included in the first set of social media posts) based upon a determination that the one or more social media posts are accessible via the first user account.

Alternatively and/or additionally, in an example where the access scope and/or the one or more first types of resource access associated with the first request are associated with messages of the first user account, messages associated with the first user account may be analyzed to identify a first set of messages (e.g., a set of one or more messages) associated with the first request (and/or associated with the access scope). For example, the first set of messages may be determined to be associated with the access scope and/or the one or more first types of resource access associated with the first request. Responsive to the one or more first types of resource access of the access scope comprising the eleventh type of resource access (associated with messages composed and/or transmitted using the first user account), one or more messages of the first set of messages may be identified (and/or included in the first set of messages) based upon a determination that the one or more messages are composed and/or transmitted using the first user account. Alternatively and/or additionally, responsive to the one or more first types of resource access of the access scope comprising the twelfth type of resource access (associated with messages received by the first user account), one or more messages of the first set of messages may be identified (and/or included in the first set of messages) based upon a determination that the one or more messages are received by the first user account. Alternatively and/or additionally, responsive to the access scope being associated with access to messages associated with the first user account, the first set of messages may comprise messages associated with the first user account (e.g., the first set of messages may comprise every message transmitted and/or received by the first user account).

At 410, a first set of modified emails may be generated based upon the first set of emails. In some examples, a modified email of the first set of modified emails may comprise an indication of the first DEA. In some examples, one or more first emails of the first set of emails may correspond to emails received by the first email account. One or more first modified emails of the first set of modified emails may be generated based upon the one or more first emails of the first set of emails. Alternatively and/or additionally, one or more second emails of the first set of emails may correspond to emails transmitted by the first email account. One or more second modified emails of the first set of modified emails may be generated based upon the one or more second emails of the first set of emails.

In some examples, a first modified email of the one or more first modified emails may be generated based upon a first email of the one or more first emails (received by the first email account). In some examples, one or more indications of the first email address may be removed from the first email to generate the first modified email. Alternatively and/or additionally, the first modified email may comprise one or more indications of the first DEA.

For example, the first email may comprise one or more indications of the first email address associated with the first email account. For example, the one or more indications of the first email address may be comprised within a first email header of the first email. For example, the first email header of the first email may comprise a first plurality of email header fields, such as a first sender address field, a first subject field, a first date field, a first recipient address field, a first return-path field, a first delivery date field, etc. For example, the first recipient address field may be indicative of a recipient of the first email and/or may comprise the first email address and/or a recipient name (e.g., the first recipient email address field may comprise "To: Jill Higgins <jillhiggins@exampleemail.com>"). Alternatively and/or additionally, the first email may comprise a first email body.

For example, the first email body may comprise content, such as one or more of text, one or more images, one or more attachments, etc.

In some examples, a second email body of the first modified email may be generated based upon the first email body of the first email. For example, the second email body of the first modified email may comprise the content of the first email body. Alternatively and/or additionally, a second email header of the first modified email may be generated based upon the first email header of the first email. In some examples, a second plurality of email header fields, such as one or more of a second sender address field, a second subject field, a second date field, a second recipient address field, a second return-path field, a second delivery date field, etc. may be generated based upon the first plurality of email header fields and/or the first DEA. For example, the second recipient email address field of the first modified email may comprise the first DEA (e.g., the second recipient email address field may comprise "To: Jill Higgins <k034950@exampleemail.com>" and/or "To: <k034950@exampleemail.com>"). Alternatively and/or additionally, the second sender address field of the first modified email may be the same as the first sender address field of the first email. Alternatively and/or additionally, the second subject field of the first modified email may be the same as the first subject field of the first email. Alternatively and/or additionally, the second date field of the first modified email may be the same as the first date field of the first email. Alternatively and/or additionally, the second return-path field of the first modified email may be the same as the first return-path field of the first email. Alternatively and/or additionally, the second delivery date field of the first modified email may be the same as the first delivery date field of the first email.

In some examples, a second modified email of the one or more second modified emails may be generated based upon a second email of the one or more second emails (transmitted by the first email account). In some examples, one or more indications of the first email address may be removed from the second email to generate the second modified email. Alternatively and/or additionally, the second modified email may comprise one or more indications of the first DEA.

For example, the second email may comprise one or more indications of the first email address associated with the first email account. For example, the one or more indications of the first email address may be comprised within a third email header of the second email. For example, the third email header of the second email may comprise a third plurality of email header fields, such as a third sender address field, a third subject field, a third date field, a third recipient address field, a third return-path field, a third delivery date field, etc. For example, the third sender address field may be indicative of a sender of the second email and/or may comprise the first email address and/or a sender name (e.g., the third email address field may comprise "From: Jill Higgins <jillhiggins@exampleemail.com>"). Alternatively and/or additionally, the third return-path field may be indicative of an email address for return mail (e.g., "Reply-To:") and/or may comprise the first email address (and/or a different email address) (e.g., the third return-path field may comprise "Return-Path: <jillhiggins@exampleemail.com>"). Alternatively and/or additionally, the second email may comprise a third email body. For example, the third email body may comprise content, such as one or more of text, one or more images, one or more attachments, etc.

In some examples, a fourth email body of the second modified email may be generated based upon the third email body of the second email. For example, the fourth email body of the second modified email may comprise the content of the third email body. Alternatively and/or additionally, a fourth email header of the second modified email may be generated based upon the third email header of the second email. In some examples, a fourth plurality of email header fields, such as one or more of a fourth sender address field, a fourth subject field, a fourth date field, a fourth recipient address field, a fourth return-path field, a fourth delivery date field, etc. may be generated based upon the third plurality of email header fields and/or the first DEA. For example, the fourth sender email address field of the second modified email may comprise the first DEA (e.g., the fourth sender email address field may comprise "From: Jill Higgins <k034950@exampleemail.com>" and/or "From: <k034950@exampleemail.com>"). Alternatively and/or additionally, the fourth return-path field may comprise the first DEA (e.g., the fourth return-path field may comprise "Return-Path: <k034950@exampleemail.com>"). Alternatively and/or additionally, the fourth recipient address field of the second modified email may be the same as the third sender address field of the second email. Alternatively and/or additionally, the fourth subject field of the second modified email may be the same as the third subject field of the second email. Alternatively and/or additionally, the fourth date field of the second modified email may be the same as the third date field of the second email. Alternatively and/or additionally, the fourth delivery date field of the second modified email may be the same as the third delivery date field of the second email.

In the example where the access scope and/or the one or more first types of resource access associated with the first request are associated with social media posts of the first user account, a first set of modified social media posts may be generated based upon the first set of social media posts. For example, indications of the first user account may be removed from the first set of social media posts to generate the first set of modified social media posts (e.g., indications of the first username and/or indications of the first email address may be removed from the first set of social media posts to generate the first set of modified social media posts). Alternatively and/or additionally, indications of the first DEA may be added to the first set of social media posts to generate the first set of modified social media posts.

In the example where the access scope and/or the one or more first types of resource access associated with the first request are associated with messages of the first user account, a first set of modified messages may be generated based upon the first set of messages. For example, indications of the first user account may be removed from the first set of messages to generate the first set of modified messages (e.g., indications of the first username and/or indications of the first email address may be removed from the first set of messages to generate the first set of modified messages). Alternatively and/or additionally, indications of the first DEA may be added to the first set of messages to generate the first set of modified messages.

At 412, access to the first set of modified emails may be provided to the second system. For example, the first set of modified emails may be transmitted to the second system (e.g., the first set of modified emails may be transmitted to a server associated with the second system). In some examples, the first set of modified emails may be generated and/or access to the first set of modified emails may be provided to the second system responsive to receiving the first request (and/or responsive to receiving a different request comprising the access token and/or the access secret).

In the example where the access scope and/or the one or more first types of resource access associated with the first request are associated with social media posts of the first user account, access to the first set of modified social media posts may be provided to the second system. For example, the first set of modified social media posts may be transmitted to the second system. Alternatively and/or additionally, in an example where the first set of social media posts do not comprise indications of the first email account and/or indications of the first username, access to the first set of social media posts may be provided to the second system (and/or the first set of modified social media posts may not be generated).

In the example where the access scope and/or the one or more first types of resource access associated with the first request are associated with messages of the first user account, access to the first set of modified messages may be provided to the second system. For example, the first set of modified messages may be transmitted to the second system. Alternatively and/or additionally, in an example where the first set of messages do not comprise indications of the first email account and/or indications of the first username, access to the first set of messages may be provided to the second system (and/or the first set of modified messages may not be generated).

In some examples, the access scope and/or the first set of resources may be associated with composing and/or transmitting emails from the first email account (and/or on behalf of the first user) to one or more other email accounts. For example, the one or more first types of resource access of the access scope may comprise the fifth type of resource access. One or more transmission emails, composed and/or transmitted by the second system (on behalf of the first user), may be received (e.g., the one or more transmission emails may be received by the email service provider associated with the content system). In some examples, the one or more transmission emails may be indicative of the first DEA and/or may be addressed to one or more email addresses associated with one or more email accounts.

At 414, a fifth email (of the one or more transmission emails) may be received from the second system. In some examples, the fifth email may be addressed to a second email address associated with a second email account. Alternatively and/or additionally, the fifth email may be indicative of the first DEA. For example, a fifth email header of the fifth email may comprise one or more indications of the first DEA. In some examples, the fifth email header of the fifth email may comprise a fifth plurality of email header fields, such as a fifth sender address field, a fifth subject field, a fifth date field, a fifth recipient address field, a fifth return-path field, a fifth delivery date field, etc. For example, the fifth sender address field may be indicative of a sender of the fifth email and/or may comprise the first DEA and/or a sender name (e.g., the third email address field may comprise "From: Jill Higgins <k034950@exampleemail.com>" and/or "From: <k034950@exampleemail.com>"). Alternatively and/or additionally, the fifth return-path field may be indicative of an email address for return mail (e.g., "Reply-To:") and/or may comprise the first DEA (and/or a different email address) (e.g., the fifth return-path field may comprise "Return-Path: <k034950@exampleemail.com>"). Alternatively and/or additionally, the fifth email may comprise a fifth email body. For example, the fifth email body may comprise content, such as one or more of text, one or more images, one or more attachments, etc.

At 416, a sixth email may be generated based upon the fifth email. For example, the sixth email may be indicative of the first email address. In some examples, a sixth email body of the sixth email may be generated based upon the fifth email body of the fifth email. For example, the sixth email body of the sixth email may comprise the content of the fifth email body. Alternatively and/or additionally, a sixth email header of the sixth email may be generated based upon the fifth email header of the fifth email. In some examples, a sixth plurality of email header fields, such as one or more of a sixth sender address field, a sixth subject field, a sixth date field, a sixth recipient address field, a sixth return-path field, a sixth delivery date field, etc. may be generated based upon the fifth plurality of email header fields and/or the first email address. For example, the sixth sender email address field of the sixth email may comprise the first email address (e.g., the sixth sender email address field may comprise "From: Jill Higgins <jillhiggins@exampleemail.com>" and/or "From: <jillhiggins@exampleemail.com>"). Alternatively and/or additionally, the sixth return-path field may comprise the first email address (e.g., the sixth return-path field may comprise "Return-Path: <jillhiggins@exampleemail.com>"). Alternatively and/or additionally, the sixth recipient address field of the sixth email may be the same as the fifth sender address field of the fifth email. For example, the fifth recipient address field of the fifth email and/or the sixth recipient address field of the sixth email may comprise the second email address. Alternatively and/or additionally, the sixth subject field of the sixth email may be the same as the fifth subject field of the fifth email. Alternatively and/or additionally, the sixth date field of the sixth email may be the same as the fifth date field of the fifth email. Alternatively and/or additionally, the sixth delivery date field of the sixth email may be the same as the fifth delivery date field of the fifth email.

At 418, the sixth email may be transmitted to the second email account associated with the second email address (by the content system). In the example where the second system is associated with the price protection system, the fifth email may comprise an indication of a price reduction of a purchased product and/or a request for compensation associated with the price reduction. Alternatively and/or additionally, the second email address and/or the second email account may be associated with a first entity (e.g., a credit card servicer, a company, etc.) responsible for reimbursing the first user and/or a price protection entity associated with the second system in association with the request for compensation and/or the price reduction.

In some examples, the access scope and/or the first set of resources may not be associated with composing and/or transmitting emails from the first email account (and/or on behalf of the first user) to one or more other email accounts. For example, the one or more first types of resource access of the access scope may not comprise the fifth type of resource access. Responsive to receiving the fifth email (and/or a different email of the one or more transmission emails), the access scope may be analyzed to determine that the access scope and/or the first set of resources are not associated with composing and/or transmitting emails from the first email account (and/or on behalf of the first user). For example, responsive to determining that the access scope and/or the first set of resources are not associated with composing and/or transmitting emails from the first email account (and/or on behalf of the first user), the fifth email may be discarded and/or the sixth email may not be generated and/or transmitted to the second email account.

In some examples, a seventh email addressed to the first DEA may be received from a third email account associated with a third email address. The third email account and/or the third email address may be associated with the second system. Alternatively and/or additionally, the seventh email may be received from the second system. In some examples, a seventh email header of the seventh email may comprise one or more indications of the first DEA. For example, the seventh email header of the seventh email may comprise a seventh plurality of email header fields, such as a seventh sender address field, a seventh subject field, a seventh date field, a seventh recipient address field, a seventh return-path field, a seventh delivery date field, etc. For example, the seventh recipient address field may be indicative of a recipient of the first email and/or may comprise the seventh email address and/or a recipient name (e.g., the seventh recipient email address field may comprise "To: Jill Higgins <k034950@exampleemail.com>" and/or "To: <k034950@exampleemail.com>"). Alternatively and/or additionally, the seventh email may comprise a seventh email body. For example, the seventh email body may comprise content, such as one or more of text, one or more images, one or more attachments, etc.

In some examples, the seventh email may be transmitted to the first email account. For example, the seventh email may be transmitted to the first email account based upon a determination that the first DEA is active (and/or is not deactivated). Alternatively and/or additionally, the seventh email may be transmitted to the first email account based upon a determination that the first DEA is associated with the first email account. For example, a DEA database may be analyzed based upon the first DEA to identify the first email account. For example, the DEA database may comprise a plurality of DEAs. A DEA of the plurality of DEAs may be associated with an email account of a plurality of email accounts associated with the content system. Alternatively and/or additionally, a DEA of the plurality of DEAs may be associated with a user account of a plurality of user accounts associated with the content system. For example, a DEA of the plurality of DEAs may be tagged with an indication of an email account of the plurality of email accounts. Alternatively and/or additionally, a DEA of the plurality of DEAs may be tagged with an indication of a user account of the plurality of user accounts. The DEA database may be analyzed based upon the first DEA. The seventh email may be transmitted to the first email account responsive to identifying the first DEA and/or determining that the first DEA is tagged with an indication of the first email account.

Alternatively and/or additionally, a DEA of the plurality of DEAs may be tagged with a status tag. For example, a status tag may be indicative of a status of a corresponding DEA. For example, a status tag may be indicative of a DEA being associated with an active status where emails addressed to the DEA are transmitted to an email account corresponding to the DEA. Alternatively and/or additionally, a status tag may be indicative of a DEA being associated with a deactivated status where emails addressed to the DEA are not automatically transmitted to an email account corresponding to the DEA. For example, the seventh email may be transmitted to the first email account responsive to identifying the first DEA and/or determining that the first DEA is active. For example, it may be determined that the first DEA is active based upon a determination that a first status tag associated with the first DEA is indicative of the first DEA being associated with an active status.

Alternatively and/or additionally, an eighth email may be generated based upon the seventh email. For example, an eighth email body of the eighth email may be generated based upon the seventh email body of the seventh email. For example, the eighth email body of the eighth email may comprise the content of the seventh email body. Alternatively and/or additionally, an eighth email header of the eighth email may be generated based upon the seventh email header of the seventh email. In some examples, an eighth plurality of email header fields, such as one or more of an eighth sender address field, an eighth subject field, an eighth date field, an eighth recipient address field, an eighth return-path field, an eighth delivery date field, etc. may be generated based upon the seventh plurality of email header fields of the seventh email and/or the first email address. For example, the eighth recipient email address field of the eighth email may comprise the first email address (e.g., the second recipient email address field may comprise "To: Jill Higgins <jillhiggins@exampleemail.com>" and/or "To: <jillhiggins@exampleemail.com>").

In some examples, the eighth email may be transmitted to the first email account. For example, the eighth email may be generated and/or transmitted to the first email account based upon a determination that the first DEA is active (and/or is not deactivated). Alternatively and/or additionally, the eighth email may be generated and/or transmitted to the first email account based upon a determination that the first DEA is associated with the first email account.

Alternatively and/or additionally, in an example where the first user account is associated with a messaging account associated with the communication service and/or a social media account associated with the social media service, a first message may be generated based upon the seventh email. For example, the first message may comprise the content of the seventh email. The first message may be transmitted to the first user account and/or to the first client device.

At 420, the first DEA may be deactivated. In some examples, deactivating the first DEA may be associated with changing a status of the first DEA from active to deactivated. For example, the first status tag associated with the first DEA may be modified such that rather than the first status tag being indicative of the first DEA being associated with the active status, the first status tag may be indicative of the first DEA being associated with a deactivated status. Alternatively and/or additionally, deactivating the first DEA may be associated with removing the first DEA from the DEA database. Alternatively and/or additionally, deactivating the first DEA may be associated with not providing the second system with access to resources associated with the access scope.

In some examples, the first DEA may be deactivated responsive to receiving a second request to deactivate the first DEA. For example, the second request to deactivate the first DEA may be received from the first client device associated with the first email account (and/or the first user account). Alternatively and/or additionally, the second request to deactivate the first DEA may be received from a different client device associated with the first email account (and/or the first user account) (e.g., the different client device may be logged into the first email account and/or the first user account).

In some examples, the first client device may be used to display a deactivation interface (e.g., the deactivation interface may be a web page associated with the content system and/or the deactivation interface may be accessed via a notification, a message and/or an email, transmitted by the content system, to the first email account, etc.). Alternatively and/or additionally, the deactivation interface may be accessed and/or displayed via an interface of the one or more interfaces associated with the content system. The deactivation interface may comprise a deactivate selectable input corresponding to requesting deactivation of the first DEA. For example, the second request to deactivate the first DEA may be received responsive to a selection of the deactivate selectable input.

In some examples, a first notification may be transmitted to the first client device responsive to a determination that a first duration of time that the first DEA is active (e.g., a duration of time since a time that the first DEA was generated) meets a first threshold duration of time (e.g., one week, one month, etc.). For example, the first notification may be a ninth email transmitted to the first email account. Alternatively and/or additionally, the first notification may be a message transmitted to the first user account and/or to the first client device. The first notification may be indicative of the first duration of time meeting the first threshold duration of time (e.g., the first notification may comprise "The DEA for the price protection system accessing your email account was generated one month ago. Do you want to deactivate the DEA?"). Alternatively and/or additionally, the first notification may comprise a second deactivate selectable input. Responsive to a selection of the second deactivate selectable input, the second request to deactivate the first DEA may be received.

Alternatively and/or additionally, a second notification may be transmitted to the first client device responsive to a determination that a second duration of time of inactivity associated with the first DEA meets a second threshold duration of time. For example, the second duration of time of inactivity may correspond to a time in which an email addressed to the first DEA is not received by the first email account and/or the content system (e.g., 0 emails addressed to the first DEA are received by the first email account and/or the content system during the second duration of time of inactivity). Alternatively and/or additionally, the second duration of time of inactivity may correspond to a time in which one or more emails and/or one or more modified emails associated with the first email account are not accessed by the second system. Alternatively and/or additionally, the second duration of time of inactivity may correspond to a time in which one or more emails having sender addresses corresponding to the first DEA (composed and/or transmitted on behalf of the first user) are not received by the content system. Alternatively and/or additionally, the second duration of time of inactivity may correspond to a time in which one or more resources associated with the first email account and/or the first user account are not accessed by the second system. Alternatively and/or additionally, the second notification may be a tenth email transmitted to the first email account. Alternatively and/or additionally, the second notification may be a message transmitted to the first user account and/or to the first client device.

For example, the second notification may be indicative of the second duration of time of inactivity meeting the second threshold duration of time (e.g., the second notification may comprise "You haven't received any emails addressed to the DEA in over a month and you haven't been using the price protection services. Do you want to deactivate the DEA?"). The second notification may comprise a third deactivate selectable input. Responsive to a selection of the third deactivate selectable input, the second request to deactivate the first DEA may be received.

Alternatively and/or additionally, a third notification may be transmitted to the first client device responsive to identifying one or more malicious emails and/or messages addressed to the first DEA. For example, the third notification may be an eleventh email transmitted to the first email account. Alternatively and/or additionally, the third notification may be a message transmitted to the first user account and/or to the first client device. The one or more malicious emails may be determined to be malicious based upon a determination that the one or more malicious emails match one or more emails stored in a database of malicious emails comprising emails previously marked as being malicious. Alternatively and/or additionally, the one or more malicious emails may be determined to be malicious based upon a determination that the one or more malicious emails comprise links to unsecure and/or malicious web pages (e.g., blacklisted web pages). For example, the third notification may be indicative of the one or more malicious emails (e.g., the eleventh email may comprise "Malicious emails addressed to the DEA associated with the Price Protection System have been identified. It seems the DEA may be targeted by malicious entities. Do you want to deactivate the DEA?"). The third notification may comprise a fourth deactivate selectable input. Responsive to a selection of the fourth deactivate selectable input, the second request to deactivate the first DEA may be received.

In some examples, the first DEA may be deactivated (automatically) responsive to the determination that the first duration of time that the first DEA is active is greater than the first threshold duration of time (and/or a third threshold duration of time). Alternatively and/or additionally, the first DEA may be deactivated (automatically) responsive to the determination that second duration of time of inactivity associated with the first DEA is greater than the second threshold duration of time (and/or a fourth threshold duration of time). Alternatively and/or additionally, the first DEA may be deactivated (automatically) responsive to identifying the one or more malicious emails addressed to the first DEA and/or determining that a quantity of malicious emails of the one or more malicious emails is greater than a threshold quantity of malicious emails.

In some examples, a fourth notification associated with deactivation of the first DEA may be transmitted to a system client device associated with the second system. For example, the fourth notification may be a twelfth email transmitted to an email account associated with the second system. Alternatively and/or additionally, the fourth notification may be a message transmitted to the system client device. In some examples, the fourth notification may be indicative of deactivation of the first DEA if compensation is not received from an entity associated with the second system (e.g., the fourth notification may comprise, "A DEA of a user account using your system will be deactivated and you will lose access to resources associated with the user account if you do not provide a payment to us. Would you like to provide a payment so that the DEA is not deactivated?"). Alternatively and/or additionally, the fourth notification may be transmitted to the system client device responsive to a determination that DEAs associated with a second plurality of email accounts (and/or a plurality of user accounts) are scheduled to be deactivated within a period of time. For example, the fourth notification may be transmitted to the system client device responsive to a determination that a quantity of email accounts of the second plurality of email accounts (and/or a quantity of user accounts of the plurality of user accounts) meet a threshold quantity. Alternatively and/or additionally, the fourth notification may be indicative of deactivation of the DEAs associated with the second plurality of email accounts (and/or the plurality of user accounts) if compensation is not received from an entity associated with the second system (e.g., the fourth notification may comprise, "DEAs of 110 user accounts using your system will be deactivated and you will lose access to resources associated with the user accounts if you do not provide a payment to us. Would you like to provide a payment so that the DEAs are not deactivated?"). In some examples, the fourth notification may comprise a sixth selectable input associated with providing a payment to (an account associated with) the content system. For example, responsive to receiving a payment, the first DEA and/or the DEAs associated with the second plurality of email accounts (and/or the plurality of user accounts) may not be deactivated at one or more scheduled deactivation times. Alternatively and/or additionally, the one or more scheduled deactivation times may be modified based upon the payment (e.g., the one or more scheduled deactivation times may be modified by adding a period of time, such as one or more of a week, a month, a year, etc., to the one or more scheduled deactivation times).

In some examples, after deactivating the first DEA, a third request to access one or more resources associated with the access scope may be received from the second system. For example, the third request may comprise the access token and/or the access secret. In some examples, the access token and/or the access secret may be associated with the first DEA. The third request to access one or more resources associated with the access scope may be denied responsive to a determination that the first DEA is deactivated and/or is not active (e.g., it may be determined that the first DEA is deactivated and/or is not active based upon the DEA database). Alternatively and/or additionally, the access token and/or the access secret may be deactivated in association with deactivating the first DEA. For example, the third request to access one or more resources associated with the access scope may be denied responsive to a determination that the access token and/or the access secret are deactivated.

It may be appreciated that one or more of the techniques presented herein may be performed using a protocol, such as an OAuth protocol and/or a different protocol associated with authorizing a system to user resources associated with a user account. For example, the access token and/or the access secret may be generated and/or used in accordance with the protocol. Alternatively and/or additionally, the second system may be provided with access to one or more resources associated with the first email account and/or the first user account in accordance with the protocol.

FIGS. 5A-5H illustrate examples of a system 501 for providing a system with access to one or more resources associated with a user account using a DEA. A first user, such as user Thomas, and/or a first client device 500 associated with the first user may access and/or interact with an email system for sending and/or receiving emails. For example, a first email account of the first user with the email system may be accessed and/or interacted with via a first email interface, such as an email client, a web email interface accessed via a browser, an email application, etc. on the first client device 500. In some examples, the email system may be associated with an email service provider.

Figure 5A:
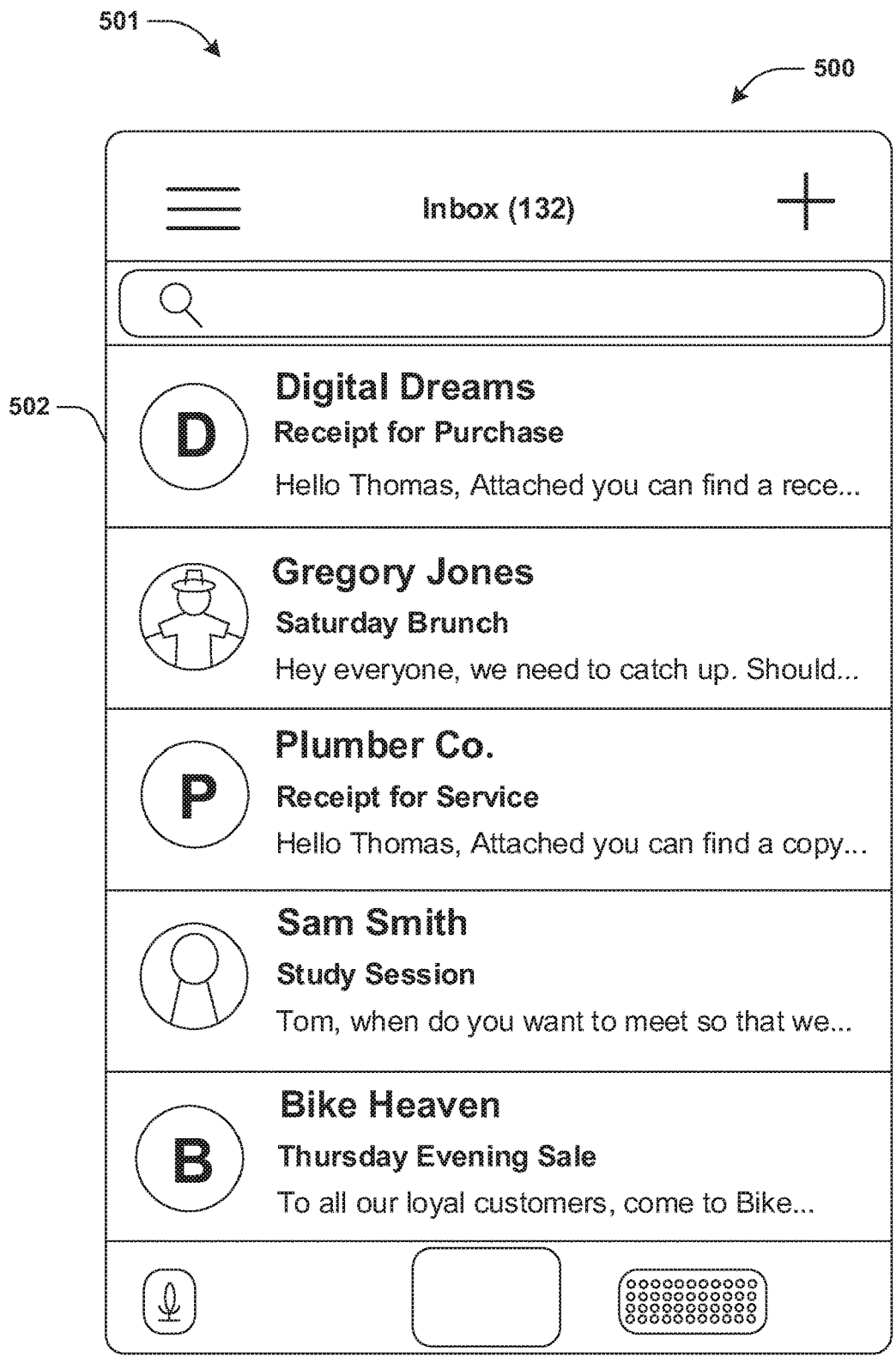
FIG. 5A is a component block diagram illustrating an example system for providing a system with access to one or more resources associated with a user account using a DEA, where a graphical user interface of a first client device is controlled to display a first email interface.

FIG. 5A illustrates a graphical user interface of the first client device 500 being controlled to display the first email interface. For example, the first email interface may display a list of emails. The list of emails may correspond to an inbox of the first email account. The list of emails may comprise a first list item 502 corresponding to a first email 544 (illustrated in FIG. 5B). For example, a selection of the first list item 502 may be received via the first email interface.

Figure 5B:
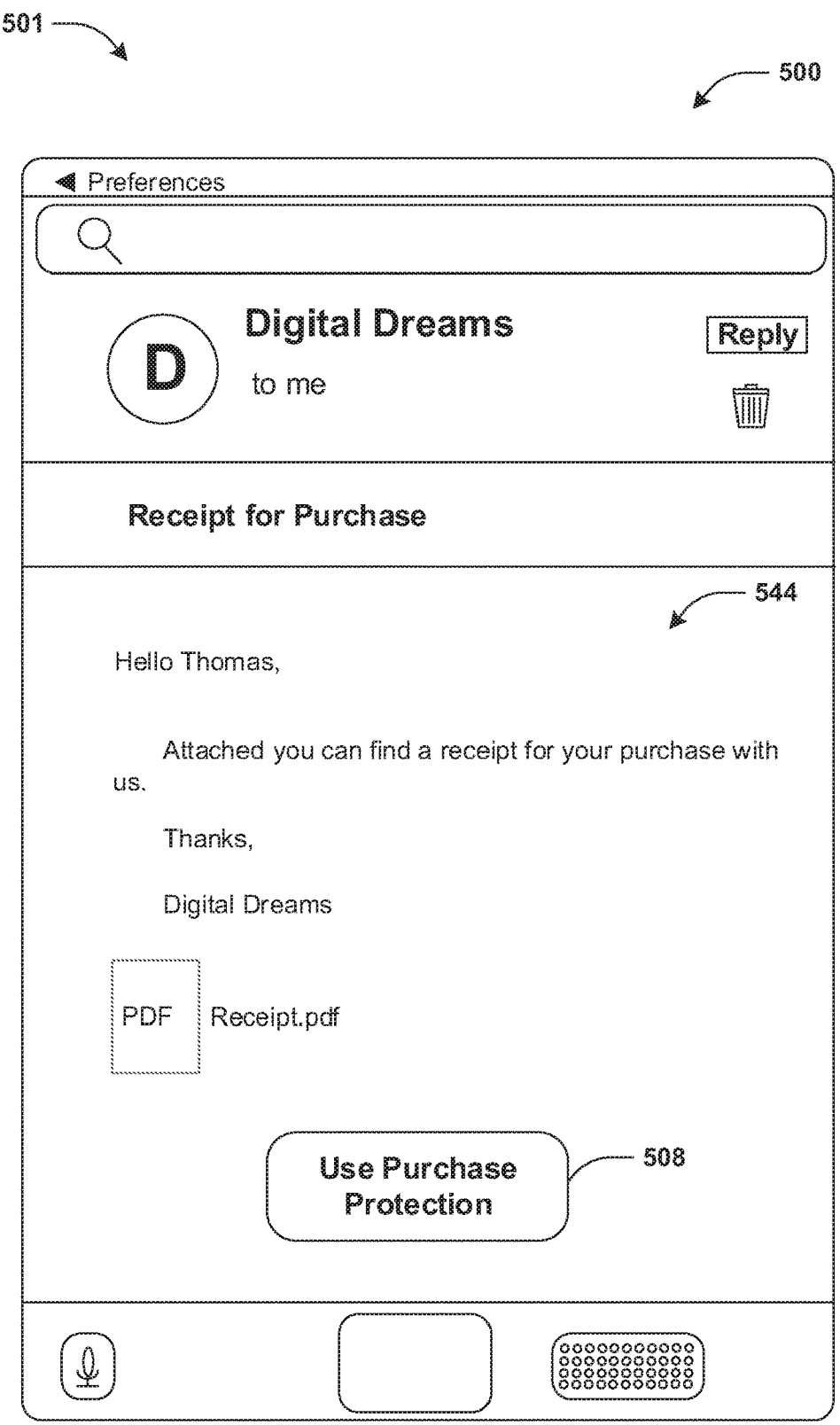
FIG. 5B is a component block diagram illustrating an example system for providing a system with access to one or more resources associated with a user account using a DEA, where a graphical user interface of a first client device is controlled to display a first email.

FIG. 5B illustrates the graphical user interface of the first client device 500 being controlled to display the first email 544. For example, the first email 544 may be displayed responsive to the selection of the first list item 502 from the list of emails. In some examples, the first email 544 may comprise purchase information (e.g., a purchase confirmation, a purchase receipt, etc.) associated with a purchase by the first user. In some examples, it may be determined that subject matter of the first email 544 matches and/or is related to one or more services provided by a price protection system associated with analyzing purchase information associated with users to obtain refunds and/or compensation responsive to price reductions associated with purchased products.

Responsive to determining that the subject matter of the first email 544 matches and/or is related to the one or more services provided by the price protection system, a content item 508 may be displayed adjacent to the first email 544. For example, the content item 508 may comprise a selectable input associated with providing the price protection system with access to one or more resources associated with the one or more services. Alternatively and/or additionally, the content item 508 may be associated with linking the price protection system with the first email account. Alternatively and/or additionally, the content item 508 may be associated with enabling the price protection system to perform operations associated with the first email account on behalf of the first user.

In some examples, a selection of the selectable input (and/or the content item 508) may be received. Responsive to the selection of the selectable input (and/or the content item 508), a request token may be generated and/or transmitted to the price protection system. Alternatively and/or additionally, responsive to the selection of the selectable input (and/or the content item 508), a token secret may be generated and/or transmitted to the price protection system. Alternatively and/or additionally, responsive to the selection of the selectable input (and/or the content item 508), an authentication process may be performed to verify an identify of the first user. In some examples, the authentication process may be performed using login information received via a login interface, a two-step verification process, an MFA process, a single-factor authentication process and/or a different type of authentication process.

Figure 5C:
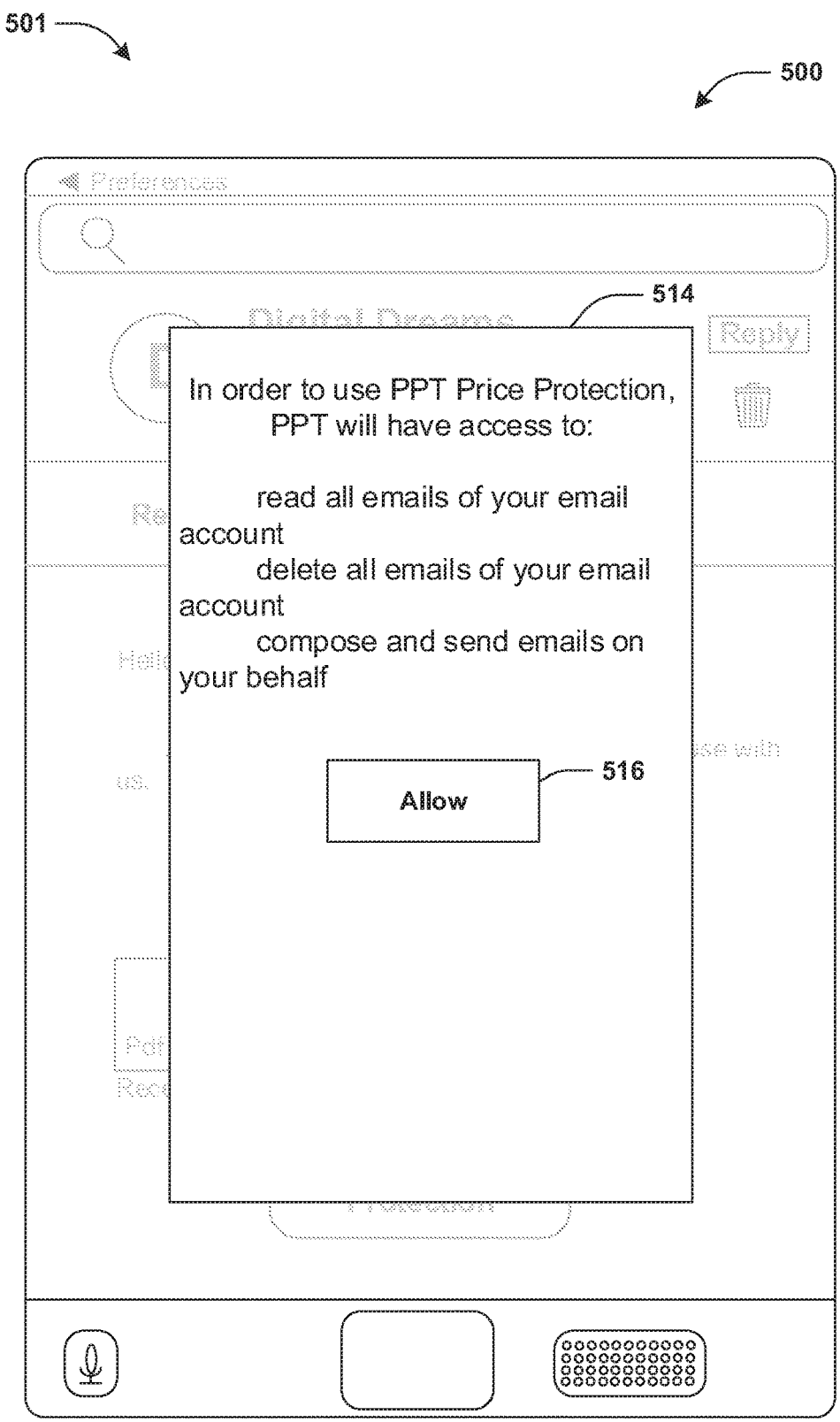
FIG. 5C is a component block diagram illustrating an example system for providing a system with access to one or more resources associated with a user account using a DEA, where a graphical user interface of a first client device is controlled to display a consent interface.

FIG. 5C illustrates the graphical user interface of the first client device 500 being controlled to display a consent interface 514. For example, the consent interface 514 may be displayed responsive to the authentication process being performed. In some examples, the consent interface 514 may comprise a scope message indicative of an access scope associated with one or more first types of resource access. For example, the access scope may be associated with reading (all) emails associated with the first email account, composing and/or transmitting emails using the first email account and/or deleting emails associated with the first email account. In some examples, the consent interface 514 may comprise a first selectable input 516 associated with providing the price protection system with access to resources associated with the access scope. For example, a selection of the first selectable input 516 may be indicative of (and/or interpreted as) consent of the first user to provide the price protection system with access to resources associated with the access scope. In some examples, responsive to a selection of the first selectable input 516, the request token may be authorized (by the email system) and/or the price protection system may be granted access to resources associated with the access scope.

Figure 5D:
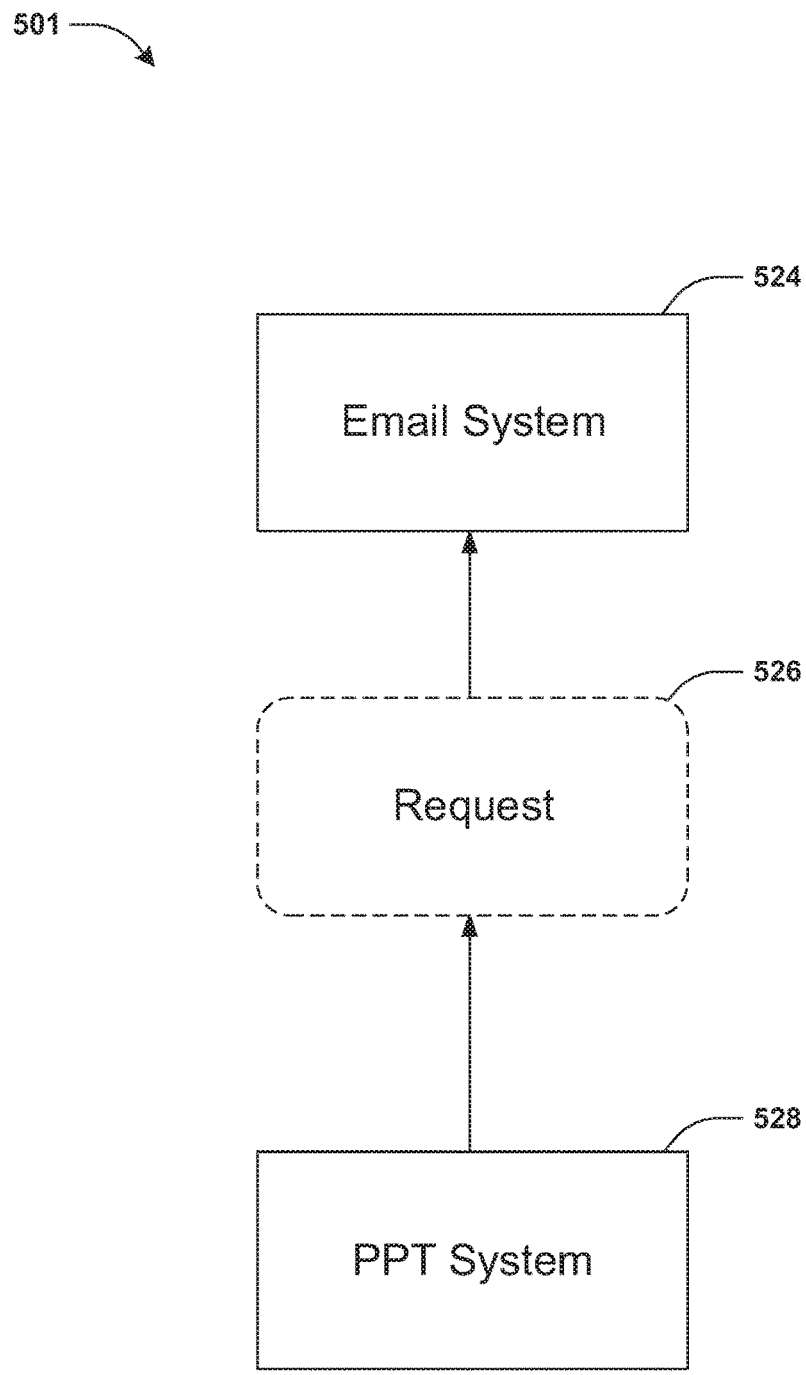
FIG. 5D is a component block diagram illustrating an example system for providing a system with access to one or more resources associated with a user account using a DEA, where a request to provide a price protection system with access to resources associated with an access scope is transmitted by a first server associated with the price protection system to a second server associated with an email system.

FIG. 5D illustrates a request 526 to provide the price protection system with access to resources associated with the access scope being transmitted by a first server 528 associated with the price protection system to a second server 524 associated with the email system. In some examples, the request 526 may be transmitted to the second server 524 associated with the email system after the selection of the first selectable input 516 (and/or before the selection of the first selectable input 516). Alternatively and/or additionally, the request 526 may be transmitted to the second server 524 associated with the email system after the after the request token is authorized (and/or before the request token is authorized). Alternatively and/or additionally, the request 526 may comprise the request token and/or the token secret.

In some examples, an access message may be transmitted to the first server 528 associated with the price protection system. For example, the access message may be transmitted to the first server 528 associated with the price protection system responsive to receiving the request 526. Alternatively and/or additionally, the access message may be transmitted to the first server 528 associated with the price protection system responsive to receiving the request token and/or the token secret and/or determining that the request token is authorized. In some examples, the access message may comprise an access token and/or an access secret. Alternatively and/or additionally, the access token and/or the access secret may be used by the price protection system to access resources associated with the access scope.

In some examples, a first DEA (e.g., "6234@email.com") associated with the first email account may be generated. Alternatively and/or additionally, the first DEA may be transmitted to the first server 528 associated with the price protection system. In some examples, the first DEA may be transmitted to the first server 528 associated with the price protection system via the access message (e.g., the access message may comprise the first DEA, the access token and/or the access secret). Alternatively and/or additionally, the first DEA may be transmitted to the first server 528 associated with the price protection system separately from the access message.

Figure 5E:
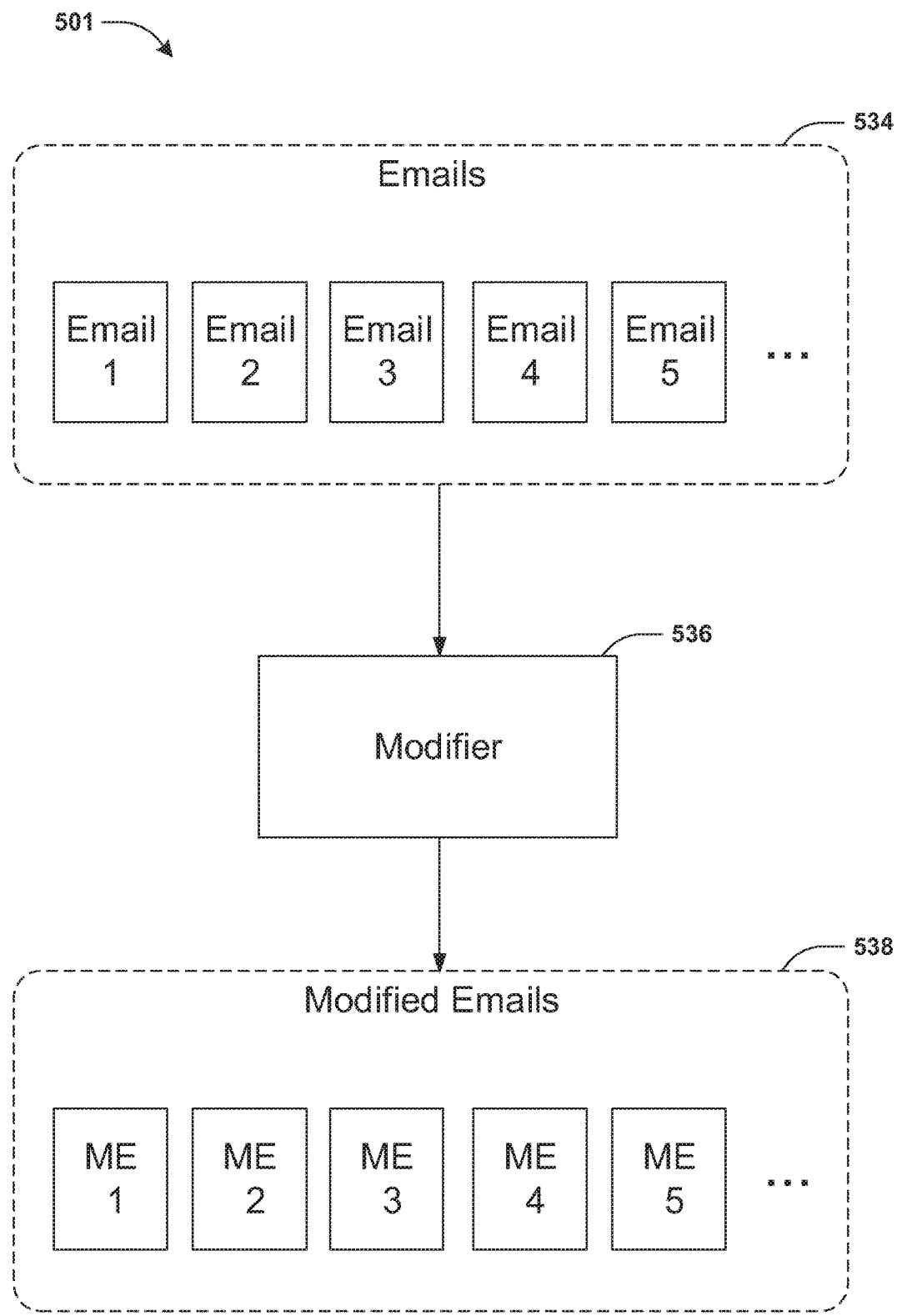
FIG. 5E is a component block diagram illustrating an example system for providing a system with access to one or more resources associated with a user account using a DEA, where a plurality of modified emails is generated based upon a plurality of emails of a first email account.

FIG. 5E illustrates a plurality of modified emails 538 being generated based upon a plurality of emails 534 of the first email account. For example, the plurality of modified emails 538 may be generated by modifying the plurality of emails 534 using a modifier 536. In some examples, the plurality of emails 534 may comprise indications of a first email address (e.g., "TomB@email.com") associated with the first email account. Alternatively and/or additionally, indications of the first email address may be removed from the plurality of emails 534 to generate the plurality of modified emails 538. Alternatively and/or additionally, indications of the first DEA may be added to the plurality of emails 534 to generate the plurality of modified emails 538.

Figure 5F:
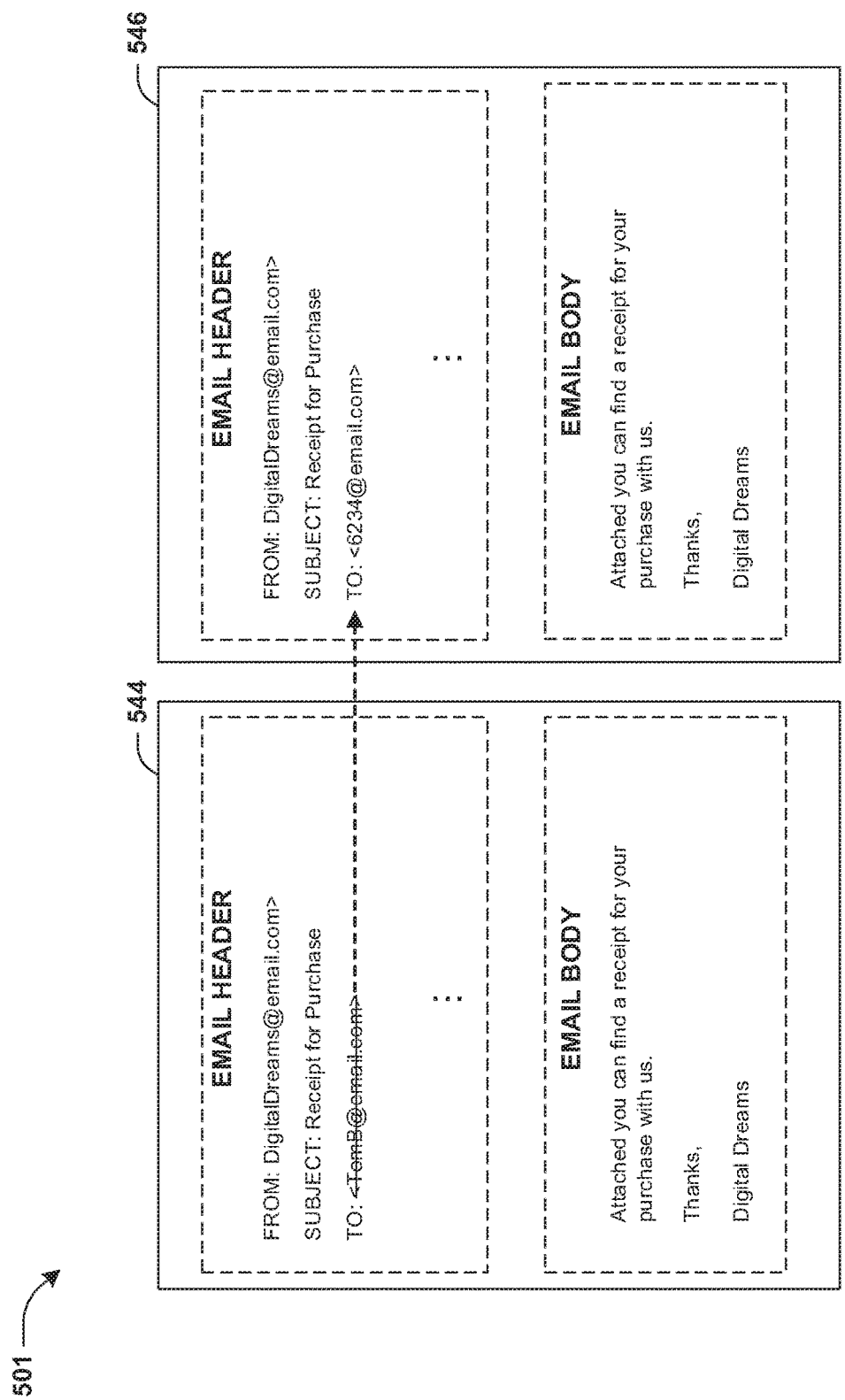
FIG. 5F is a component block diagram illustrating an example system for providing a system with access to one or more resources associated with a user account using a DEA, where a first modified email of a plurality of modified emails is generated based upon a first email of a plurality of emails.

FIG. 5F illustrates a first modified email 546 of the plurality of modified emails 538 being generated based upon the first email 544 of the plurality of emails 534. In some examples, a first recipient address field (e.g., "TO: <TomB@email.com>") of a first email header of the first email 544 may be modified to generate a second recipient address field (e.g., "TO: <6234@email.com>") of a second email header of the first modified email 546. For example, the first email address may be removed from the first recipient address field to generate the second recipient address field. Alternatively and/or additionally, the first email address within the first recipient address field may be replaced with the first DEA to generate the second recipient address field of the second email header. Alternatively and/or additionally, a second email body of the first modified email 546 may be generated based upon a first email body of the first email 544. For example, the second email body of the first modified email 546 may comprise content (e.g., text, one or more images, one or more attachments, etc.) of the first email body of the first email 544.

Figure 5G:
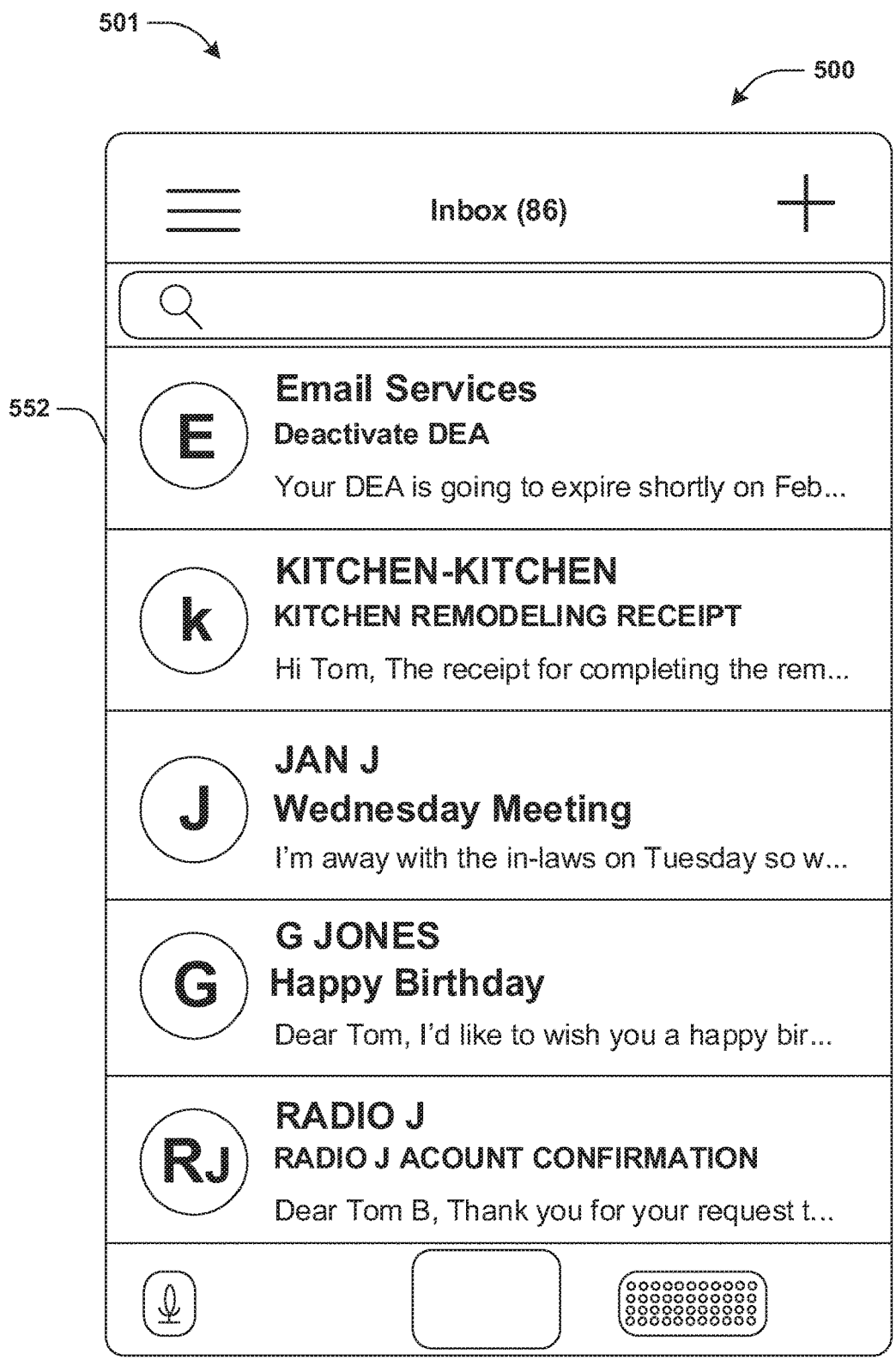
FIG. 5G is a component block diagram illustrating an example system for providing a system with access to one or more resources associated with a user account using a DEA, where a graphical user interface of a first client device is controlled to display a first email interface.

In some examples, a second email 562 (e.g., illustrated in FIG. 5H) may be transmitted to the first email account (by the email system). For example, the second email 562 may be indicative of the first DEA expiring at a first time. FIG. 5G illustrates the graphical user interface of the first client device 500 being controlled to display the first email interface. The first email interface may display a second list of emails. The second list of emails may correspond to the inbox of the first email account. The second list of emails may comprise a second list item 552 corresponding to the second email 562. For example, a selection of the second list item 552 may be received via the first email interface.

Figure 5H:
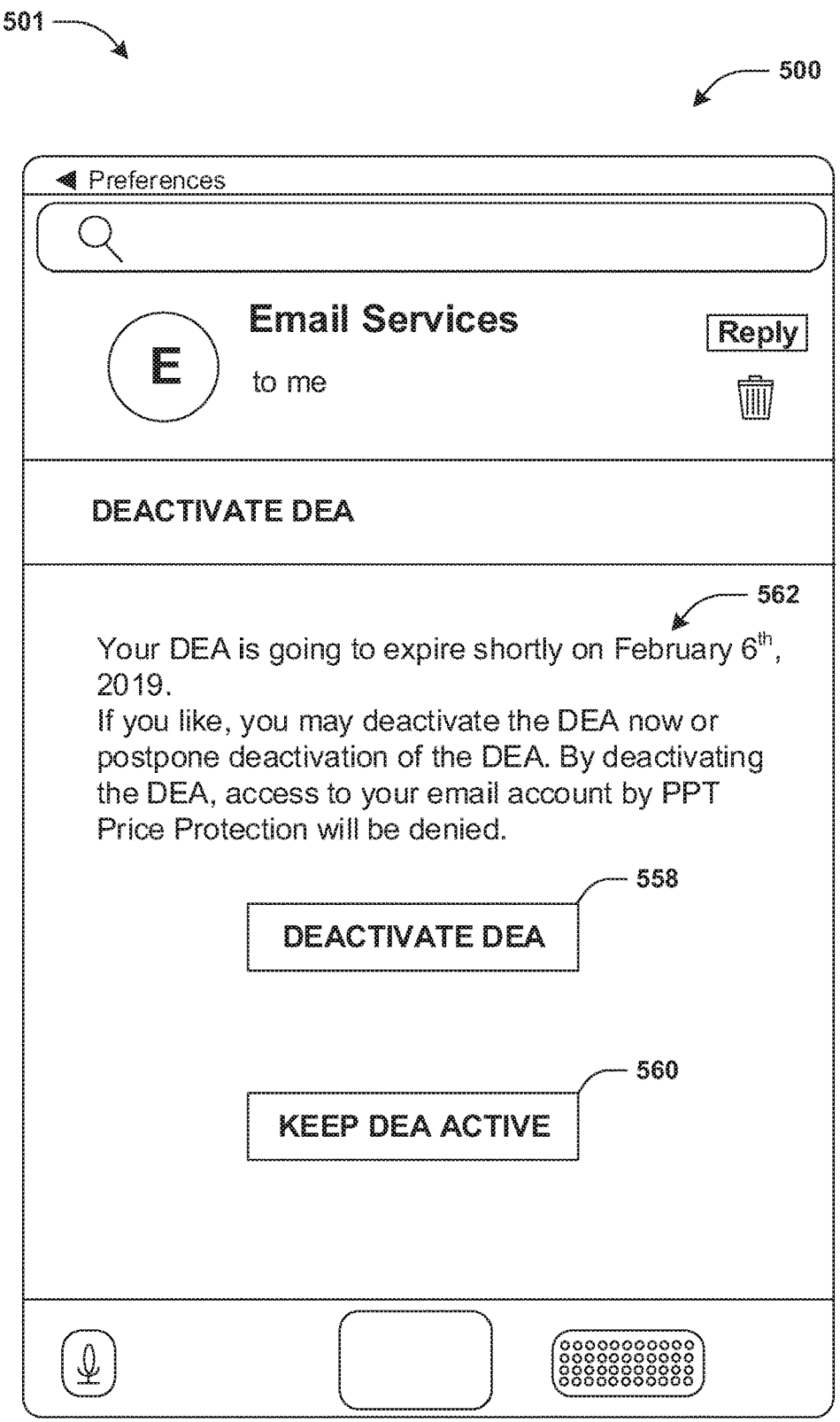
FIG. 5H is a component block diagram illustrating an example system for providing a system with access to one or more resources associated with a user account using a DEA, where a graphical user interface of a first client device is controlled to display a second email.

FIG. 5H illustrates the graphical user interface of the first client device 500 being controlled to display the second email 562. For example, the second email 562 may be displayed responsive to the selection of the second list item 552 from the second list of emails. In some examples, the second email 562 may comprise a second selectable input 558 associated with deactivating the first DEA and/or a third selectable input 560 associated with not deactivating the first DEA. In some examples, a second request to deactivate the first DEA may be received (by the email system) via a selection of the second selectable input 558. For example, responsive to receiving the second request, the first DEA may be deactivated. Alternatively and/or additionally, responsive to receiving the second request, access to resources associated with the access scope may not be provided to the price protection system.

It may be appreciated that the disclosed subject matter may assist a user (e.g., and/or a client device associated with the user) in providing a system with access to resources associated with a first user account, such as a first email account, of the user without providing a username and/or an email address (and/or other personal information) to the systems.

Implementation of at least some of the disclosed subject matter may lead to benefits including, but not limited to, a reduction in screen space and/or an improved usability of a display (of the client device) (e.g., as a result of generating a DEA corresponding to a first user account, as a result of using the DEA, rather than the email address and/or the username associated with the first user account for providing resources to a system, wherein the user may not be required to disclose the email address and/or the username associated with the first user account, wherein entities may be prevented from sending unwanted and/or undesirable emails and/or messages to the first user account by deactivating the DEA, wherein the user may not need to scroll through unwanted and/or undesirable emails and/or messages to consume (desirable) emails and/or messages, etc.).

Alternatively and/or additionally, implementation of at least some of the disclosed subject matter may lead to benefits including a reduction in bandwidth (e.g., as a result of preventing entities from sending unwanted and/or undesirable emails and/or messages to the first user account by deactivating the DEA, such that the unwanted and/or undesirable emails and/or messages are not downloaded to the client device).

Alternatively and/or additionally, implementation of at least some of the disclosed subject matter may lead to benefits including more accurate and precise transmission of content to intended users (e.g., as a result of preventing entities from sending unwanted and/or undesirable emails and/or messages to the first user account by deactivating the DEA, such that the unwanted and/or undesirable emails and/or messages are not downloaded to the client device and/or merely wanted and/or desirable emails and/or messages may be sent to the first user account and/or downloaded to the client device).

Alternatively and/or additionally, implementation of at least some of the disclosed subject matter may lead to benefits including a faster loading of content on a receiving device. For example, by reducing undesirable emails and/or messages transmitted to the first user account and/or by reducing undesirable content associated with the undesirable emails and/or messages downloaded to the client device, as provided for herein, content may be downloaded to the client device at an increased speed, and thus delay between a determination to transmit content and completion of transmission of the content and/or presenting of the content can be reduced.

Alternatively and/or additionally, implementation of at least some of the disclosed subject matter may lead to benefits including protecting user privacy and/or preventing unauthorized access to personal information associated with the user (e.g., as a result of providing the first DEA to the system rather than providing personal information such as the email address and/or the username to the system, etc.). Alternatively and/or additionally, implementation of at least some of the disclosed subject matter may lead to benefits including decreasing security resources needed to protect the personal information from unauthorized access.

In some examples, at least some of the disclosed subject matter may be implemented on a client device, and in some examples, at least some of the disclosed subject matter may be implemented on a server (e.g., hosting a service accessible via a network, such as the Internet).

Figure 6:
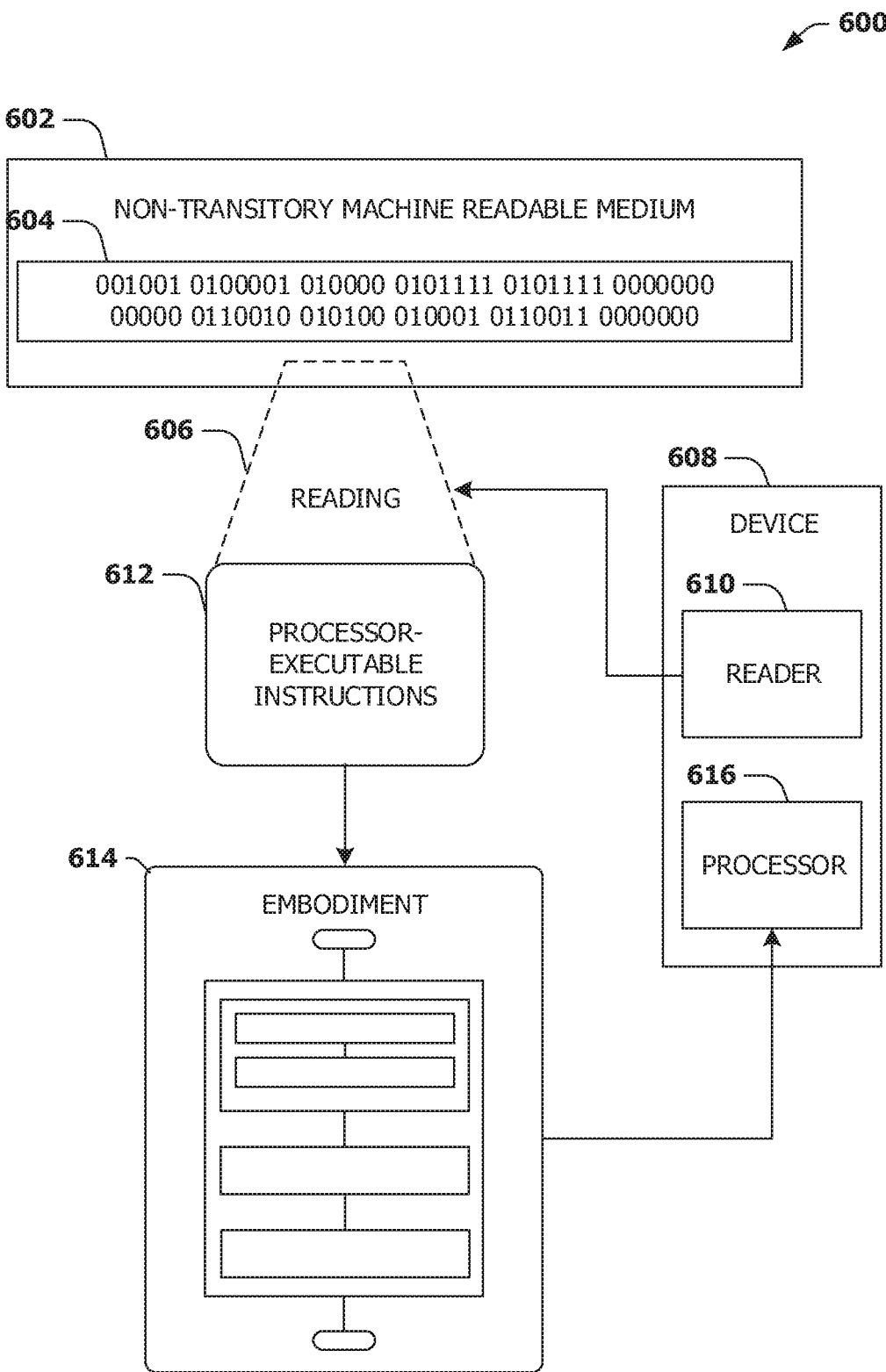
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5H, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
receiving a request to provide a system with access to a first set of resources, wherein the first set of resources are associated with a first email account associated with a first email address;
generating a first disposable email address (DEA) associated with the first email account;
transmitting, to the system, the first DEA associated with the first email account;
analyzing emails of the first email account to identify a first set of emails associated with the request to provide the system with access to the first set of resources, wherein a first email of the first set of emails comprises an indication of the first email address and a second email of the first set of emails comprises an indication of the first email address;
generating, based upon the first set of emails comprising the first email and the second email, a first set of modified emails associated with the request, wherein the generating the first set of modified emails comprises concurrently:
generating a first modified email of the first set of modified emails by replacing the indication of the first email address in the first email with an indication of the first DEA; and
generating a second modified email of the first set of modified emails by replacing the indication of the first email address in the second email with an indication of the first DEA;
providing, to the system, access to the first set of modified emails comprising the first modified email and the second modified email;
receiving a third email from the system, wherein:
the third email is addressed to a second email address; and
the third email is indicative of the first DEA;
generating, based upon the third email, a fourth email, wherein the fourth email is indicative of the first email address;
transmitting, to a second email account associated with the second email address, the fourth email; and
deactivating the first DEA.

2. The method of claim 1, comprising:
prior to the deactivating the first DEA, receiving a fifth email, addressed to the first DEA, from the system; and
transmitting the fifth email to the first email account.

3. The method of claim 1, comprising:
prior to the deactivating the first DEA, receiving a fifth email, addressed to the first DEA, from the system;
generating a fourth email based upon the fifth email, wherein the fourth email comprises an indication of the first email address; and
transmitting the fourth email to the first email account.

4. The method of claim 3, wherein the generating the fourth email based upon the fifth email comprises:
generating a fourth email body of the fourth email based upon content of a third email body of the fifth email, wherein the fourth email body of the fourth email comprises the content of the third email body of the fifth email; and
generating a fourth email header of the fourth email, wherein:
the fourth email header comprises a sender address indicative of the first email address; and
the fourth email header of the fourth email is different than a third email header of the fifth email.

5. The method of claim 1, wherein the generating the first set of modified emails comprises:
generating a first email body of the first modified email based upon content of a third email body of a fifth email of the first set of emails, wherein the first email body of the first modified email comprises the content of the third email body of the fifth email; and
generating a first email header of the first modified email, wherein at least one of:
the first email header comprises a sender address indicative of the first DEA and the first email header of the first modified email is different than a third email header of the fifth email; or
the first email header comprises a recipient address indicative of the first DEA and the first email header of the first modified email is different than the third email header of the fifth email.

6. The method of claim 1, wherein a sender address of the third email is indicative of the first DEA.

7. The method of claim 1, wherein a sender address of the fourth email is indicative of the first email address.

8. The method of claim 1, comprising:
controlling a graphical user interface of a first client device associated with the first email account to display an interface; and
displaying, via the interface, a selectable input associated with providing the system with access to the first set of resources, wherein the request is received responsive to a selection of the selectable input.

9. The method of claim 1, wherein the request is received from a server associated with the system.

10. The method of claim 1, wherein the deactivating the first DEA is performed responsive to receiving a second request to deactivate the first DEA.

11. The method of claim 10, comprising:
determining that a duration of time that the first DEA is active meets a threshold duration of time;
generating, based upon the duration of time meeting the threshold duration of time, a notification; and
transmitting the notification to a first client device associated with the first email account, wherein:
the notification comprises a selectable input corresponding to deactivating the first DEA; and
the second request to deactivate the first DEA is received via a selection of the selectable input.

12. The method of claim 1, wherein the deactivating the first DEA is performed responsive to a duration of time that the first DEA is active meeting a threshold duration of time.

13. A computing device comprising:
a processor; and
memory comprising processor-executable instructions that when executed by the processor cause performance of operations, the operations comprising:
receiving a request to provide a system with access to a first set of resources, wherein the first set of resources are associated with a first email account associated with a first email address;
generating a first disposable email address (DEA) associated with the first email account;
transmitting, to the system, the first DEA associated with the first email account;
analyzing emails of the first email account to identify a first set of emails associated with the request to provide the system with access to the first set of resources, wherein a first email of the first set of emails comprises an indication of the first email address and a second email of the first set of emails comprises an indication of the first email address;
generating, based upon the first set of emails comprising the first email and the second email, a first set of modified emails associated with the request, wherein the generating the first set of modified emails comprises concurrently:
generating a first modified email of the first set of modified emails by replacing the indication of the first email address in the first email with an indication of the first DEA; and
generating a second modified email of the first set of modified emails replacing the indication of the first email address in the second email with an indication of the first DEA;
providing, to the system, access to the first set of modified emails comprising the first modified email and the second modified email;
receiving a third email from the system, wherein:
the third email is addressed to a second email address; and
the third email is indicative of the first DEA;
generating, based upon the third email, a fourth email, wherein the fourth email is indicative of the first email address;
transmitting, to a second email account associated with the second email address, the fourth email; and
deactivating the first DEA.

14. The computing device of claim 13, wherein the request is received from a server associated with the system.

15. The computing device of claim 13, wherein the deactivating the first DEA is performed responsive to receiving a second request to deactivate the first DEA.

16. The computing device of claim 13, wherein the deactivating the first DEA is performed responsive to a duration of time that the first DEA is active meeting a threshold duration of time.

17. A non-transitory machine readable medium having stored thereon processor-executable instructions that when executed cause performance of operations, the operations comprising:
receiving a request to provide a system with access to a first set of resources, wherein the first set of resources are associated with a first email account associated with a first email address;
generating a first disposable email address (DEA) associated with the first email account;
transmitting, to the system, the first DEA associated with the first email account;
analyzing emails of the first email account to identify a first set of emails associated with the request to provide the system with access to the first set of resources, wherein a first email of the first set of emails comprises an indication of the first email address and a second email of the first set of emails comprises an indication of the first email address;
generating, based upon the first set of emails comprising the first email and the second email, a first set of modified emails associated with the request, wherein the generating the first set of modified emails comprises concurrently:
generating a first modified email of the first set of modified emails by replacing the indication of the first email address in the first email with an indication of the first DEA; and
generating a second modified email of the first set of modified emails by replacing the indication of the first email address in the second email with an indication of the first DEA;
providing, to the system, access to the first set of modified emails comprising the first modified email and the second modified email;
receiving a third email from the system, wherein:
the third email is addressed to a second email address; and
the third email is indicative of the first DEA;
generating, based upon the third email, a fourth email, wherein the fourth email is indicative of the first email address; and
transmitting, to a second email account associated with the second email address, the fourth email.

18. The non-transitory machine readable medium of claim 17, wherein the request is received from a server associated with the system.

19. The non-transitory machine readable medium of claim 17, the operations comprising:
deactivating the first DEA.

20. The non-transitory machine readable medium of claim 19, wherein the deactivating the first DEA is performed responsive to at least one of:
receiving a second request to deactivate the first DEA; or
a duration of time that the first DEA is active meeting a threshold duration of time.

* * * * *